(12) United States Patent
Izumi et al.

(10) Patent No.: US 11,054,941 B2
(45) Date of Patent: Jul. 6, 2021

(54) INFORMATION PROCESSING SYSTEM, INFORMATION PROCESSING METHOD, AND PROGRAM FOR CORRECTING OPERATION DIRECTION AND OPERATION AMOUNT

(71) Applicant: SONY CORPORATION, Tokyo (JP)

(72) Inventors: Akihiko Izumi, Kanagawa (JP); Takuya Namae, Kanagawa (JP); Kenji Hisanaga, Tokyo (JP)

(73) Assignee: SONY CORPORATION, Tokyo (JP)

(*) Notice: Subject to any disclaimer, the term of this patent is extended or adjusted under 35 U.S.C. 154(b) by 2 days.

(21) Appl. No.: 16/480,181

(22) PCT Filed: Dec. 28, 2017

(86) PCT No.: PCT/JP2017/047382
§ 371 (c)(1),
(2) Date: Jul. 23, 2019

(87) PCT Pub. No.: WO2018/150757
PCT Pub. Date: Aug. 23, 2018

(65) Prior Publication Data
US 2019/0339864 A1    Nov. 7, 2019

(30) Foreign Application Priority Data

Feb. 17, 2017 (JP) ............................ JP2017-027641

(51) Int. Cl.
*G06F 3/041* (2006.01)
*G06F 3/044* (2006.01)
(Continued)

(52) U.S. Cl.
CPC ...... *G06F 3/041661* (2019.05); *G06F 3/0447* (2019.05); *G06F 3/0485* (2013.01);
(Continued)

(58) Field of Classification Search
CPC .......... G06F 3/041661; G06F 3/04186; G06F 3/0425; G06F 3/0447; G06F 3/04845; G06F 3/0485; G06F 3/0486; G06F 3/04883

See application file for complete search history.

(56) References Cited

U.S. PATENT DOCUMENTS

2016/0274733 A1* 9/2016 Hasegawa ............. G06F 3/0488
2016/0300325 A1* 10/2016 Ikegami ................... G09G 5/14

FOREIGN PATENT DOCUMENTS

JP   H05-257636 A   10/1993
JP   H07-319615 A   12/1995
(Continued)

*Primary Examiner* — Afroza Chowdhury
(74) *Attorney, Agent, or Firm* — Paratus Law Group, PLLC

(57) ABSTRACT

There is provided an information processing system that is capable of adaptively correcting an operation direction on the basis of a rotation angle of a display object with respect to a reference angle on a display surface, and an information processing method and a program. The information processing system includes: an obtaining unit that obtains operation information regarding user's operation of a display object displayed on a display surface; and a processing unit that corrects an operation direction indicated by the operation information on the basis of a rotation angle of the display object with respect to a reference angle on the display surface, and outputs information indicating the corrected operation direction to an application corresponding to the display object, in which a rotation angle of the display object differs from a rotation angle of the display surface.

19 Claims, 16 Drawing Sheets

(51) Int. Cl.
  *G06F 3/0484* (2013.01)
  *G06F 3/0486* (2013.01)
  *G06F 3/0485* (2013.01)
(52) U.S. Cl.
  CPC ........ *G06F 3/0486* (2013.01); *G06F 3/04186* (2019.05); *G06F 3/04845* (2013.01)

(56) References Cited

FOREIGN PATENT DOCUMENTS

JP             3840266 B2    11/2006
WO    WO 2014/010458 A1     1/2014
WO    WO 2015/049892 A1     4/2015

\* cited by examiner

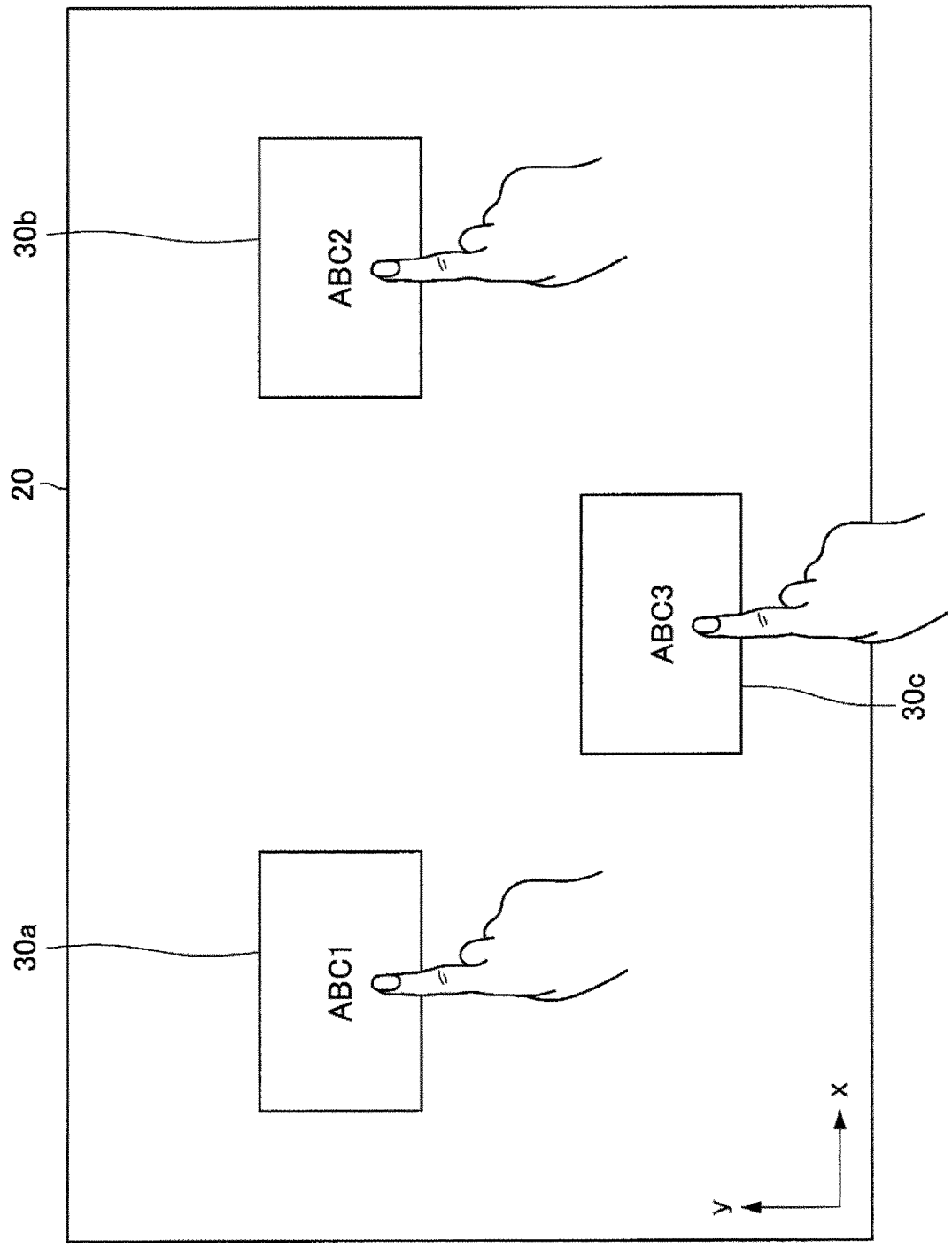

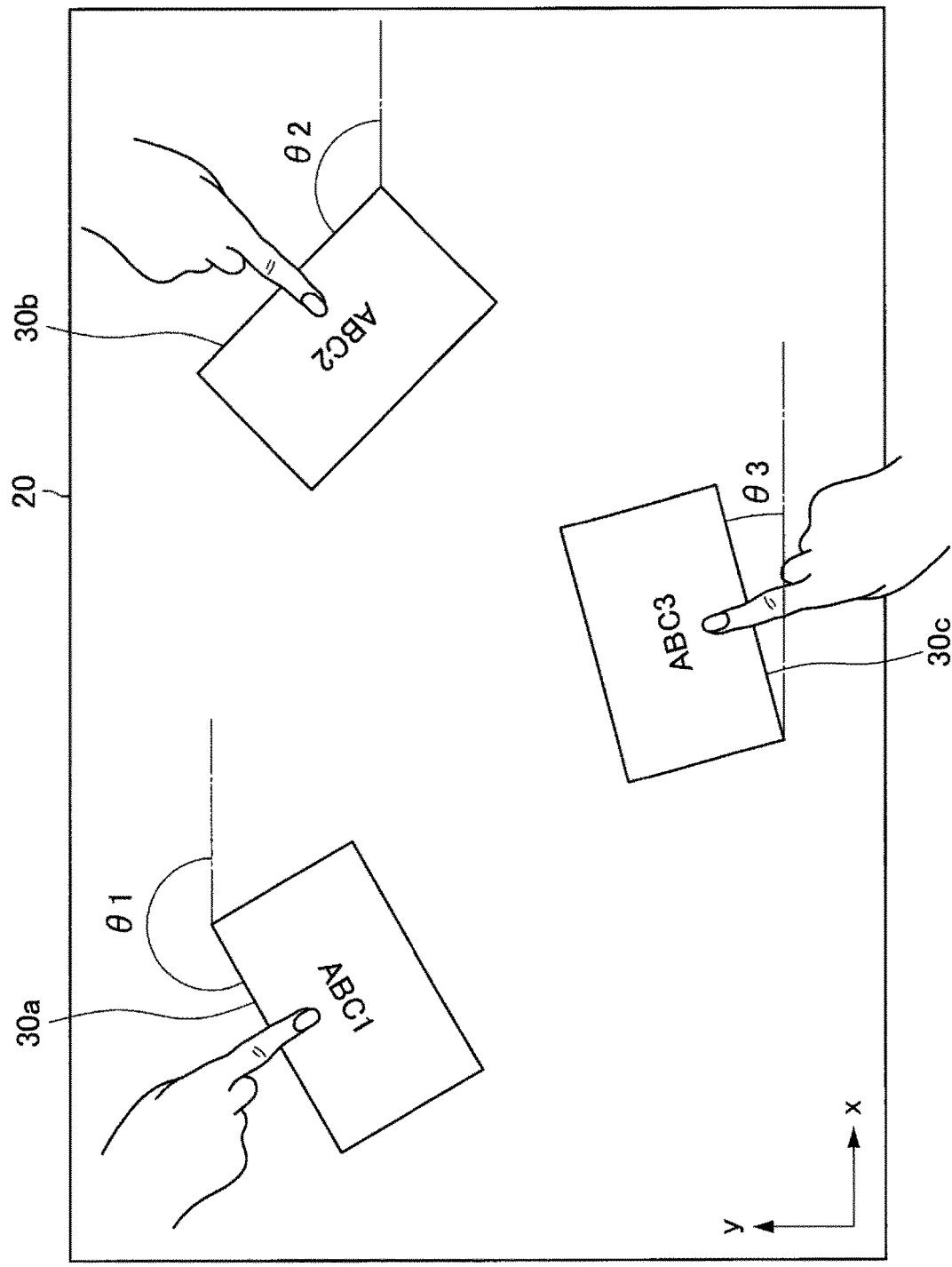

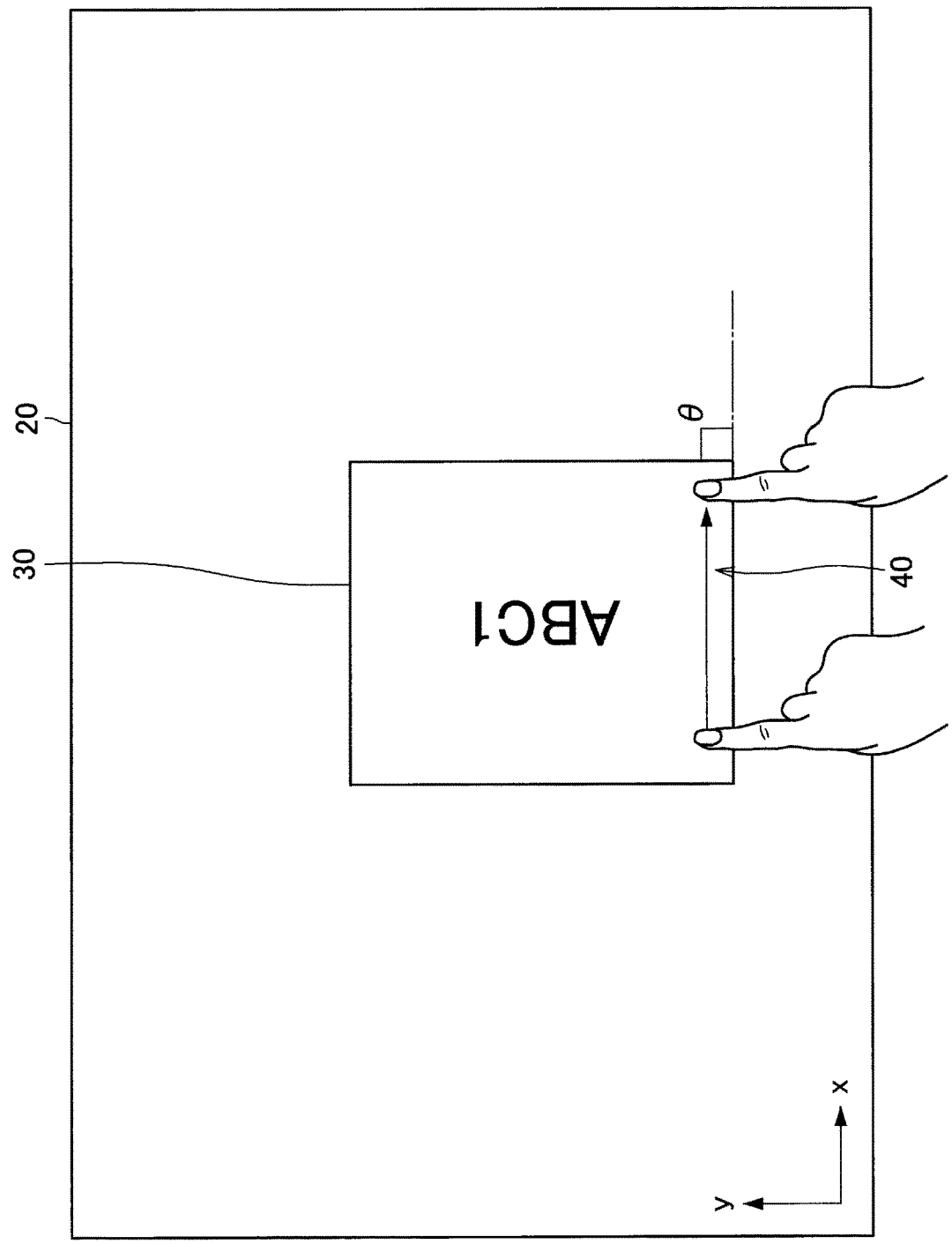

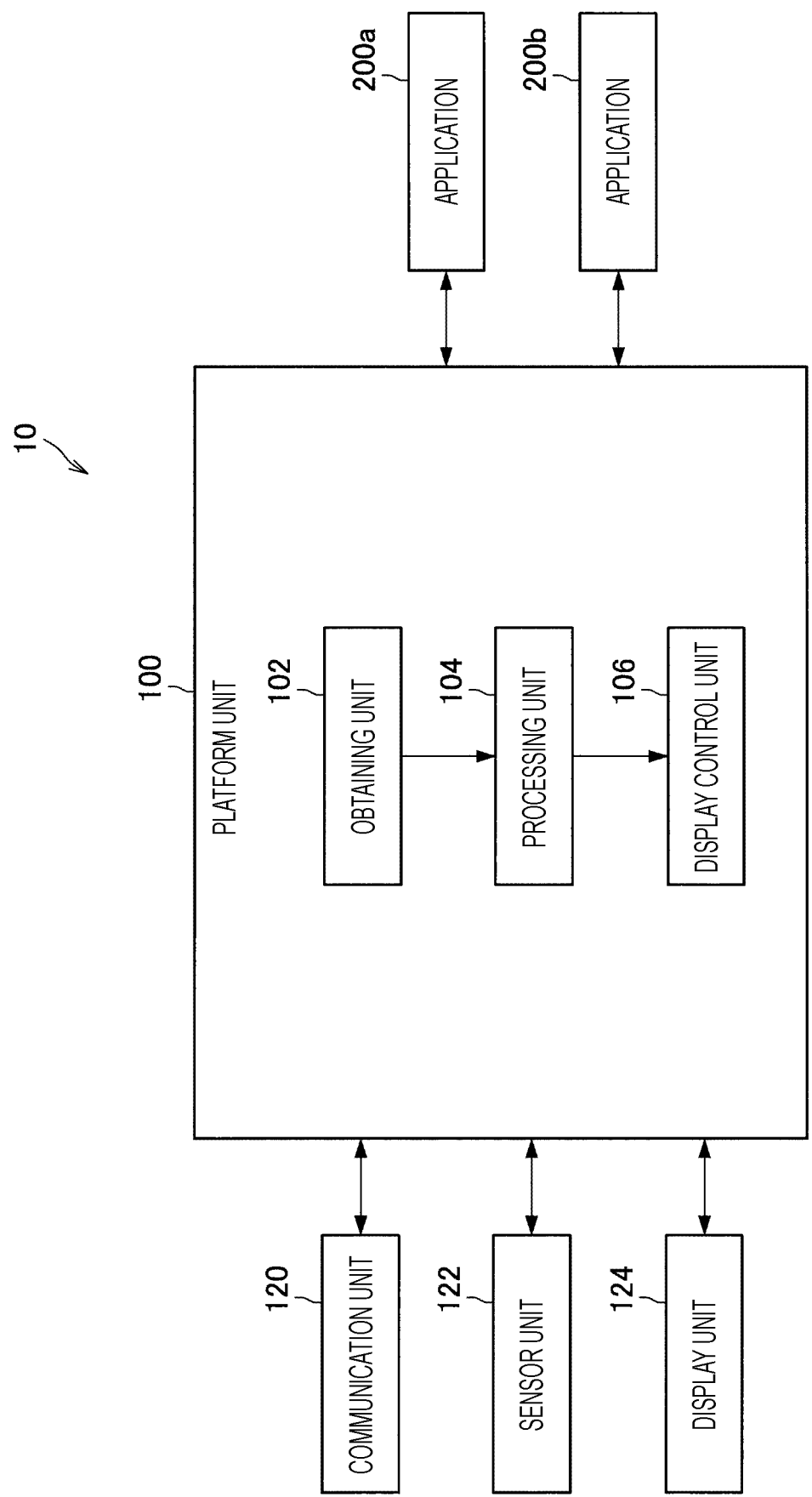

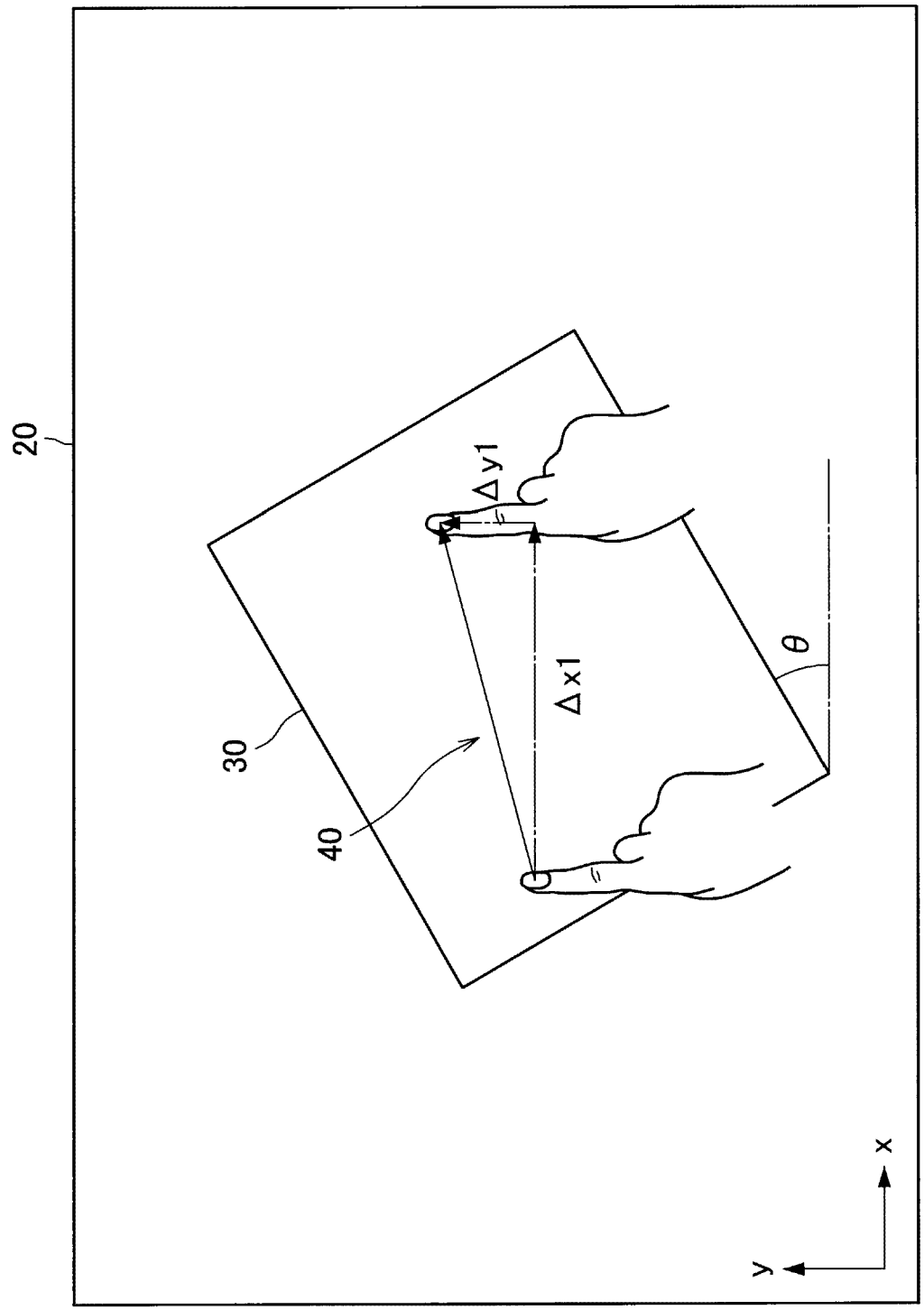

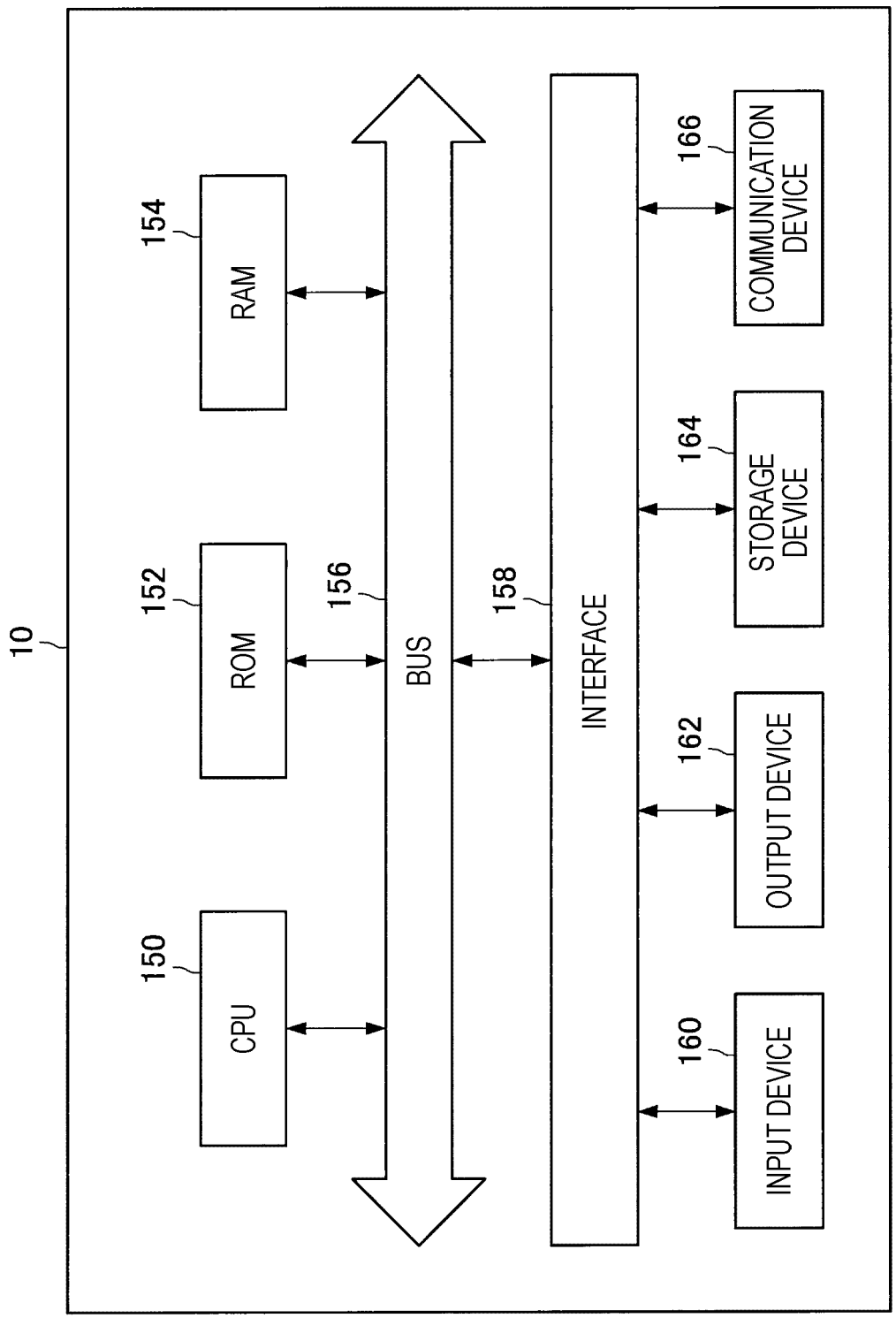

INFORMATION PROCESSING SYSTEM, INFORMATION PROCESSING METHOD, AND PROGRAM FOR CORRECTING OPERATION DIRECTION AND OPERATION AMOUNT

CROSS REFERENCE TO PRIOR APPLICATION

This application is a National Stage Patent Application of PCT International Patent Application No. PCT/JP2017/047382 (filed on Dec. 28, 2017) under 35 U.S.C. § 371, which claims priority to Japanese Patent Application No. 2017-027641 (filed on Feb. 17, 2017), which are all hereby incorporated by reference in their entirety.

TECHNICAL FIELD

The present disclosure relates to an information processing system, an information processing method, and a program.

BACKGROUND ART

Conventionally, a touch panel that is capable of detecting that a user's finger is touching or is brought close to a display screen has been developed.

For example, patent document 1 discloses a touch operation terminal that is adapted to be capable of changing an angle formed between an input unit and a display unit. In addition, Patent Document 1 indicates that an output direction corresponding to an input direction of a user with respect to the input unit is changed according to a relative angle formed between a surface of the input unit and a surface of the display unit.

CITATION LIST

Patent Document

Patent Document 1: International Publication No. 2014/10458

SUMMARY OF THE INVENTION

Problems to be Solved by the Invention

However, the technology disclosed in the Patent Document 1 does not consider the feature in which an object displayed on the display unit performs appropriate processing according to a rotation angle.

Accordingly, the present disclosure proposes a novel and improved information processing system that is capable of adaptively correcting an operation direction on the basis of a rotation angle of a display object with respect to a reference angle on a display surface, and proposes an information processing method, and a program.

Solutions to Problems

According to the present disclosure, there is provided an information processing system comprising: an obtaining unit that obtains operation information regarding user's operation of a display object displayed on a display surface; and a processing unit that corrects an operation direction indicated by the operation information on the basis of a rotation angle of the display object with respect to a reference angle on the display surface, and outputs information indicating the corrected operation direction to an application corresponding to the display object, in which a rotation angle of the display object differs from a rotation angle of the display surface.

In addition, according to the present disclosure, there is provided an information processing method that includes: obtaining operation information regarding user's operation of a display object displayed on a display surface; correcting, by a processor, an operation direction indicated by the operation information on the basis of a rotation angle of the display object with respect to a reference angle on the display surface; and outputting information indicating the corrected operation direction to an application corresponding to the display object, in which a rotation angle of the display object differs from a rotation angle of the display surface.

Moreover, according to the present disclosure, there is provided a program causing a computer to function as: an obtaining unit that obtains operation information regarding user's operation of a display object displayed on a display surface; and a processing unit that corrects an operation direction indicated by the operation information on the basis of a rotation angle of the display object with respect to a reference angle on the display surface, and outputs information indicating the corrected operation direction to an application corresponding to the display object, in which a rotation angle of the display object differs from a rotation angle of the display surface.

Effects of the Invention

As described above, according to the present disclosure, an operation direction can be adaptively corrected on the basis of a rotation angle of a display object with respect to a reference angle on a display surface. It should be noted that the effects described herein are not necessarily limited, and may be any one of the effects described in the present disclosure.

BRIEF DESCRIPTION OF DRAWINGS

FIG. 2A is an explanatory drawing illustrating an example of a window system in which each window is operated from a front direction of a screen 20.

FIG. 2B is an explanatory drawing illustrating an example of a window system in which individual windows are operated from arbitrary directions.

FIG. 5A is an explanatory drawing illustrating a state in which a touch gesture of moving a finger in a horizontal direction in a window 30 is made.

FIG. 6 is a functional block diagram illustrating a functional configuration example of the information processing system 10 according to the embodiment.

FIG. 7A is an explanatory drawing illustrating a correction example of an operation direction of a touch gesture of scrolling according to the embodiment.

FIG. 13 is an explanatory drawing illustrating a hardware configuration of the information processing system 10 according to the embodiment.

MODE FOR CARRYING OUT THE INVENTION

Figure 1:
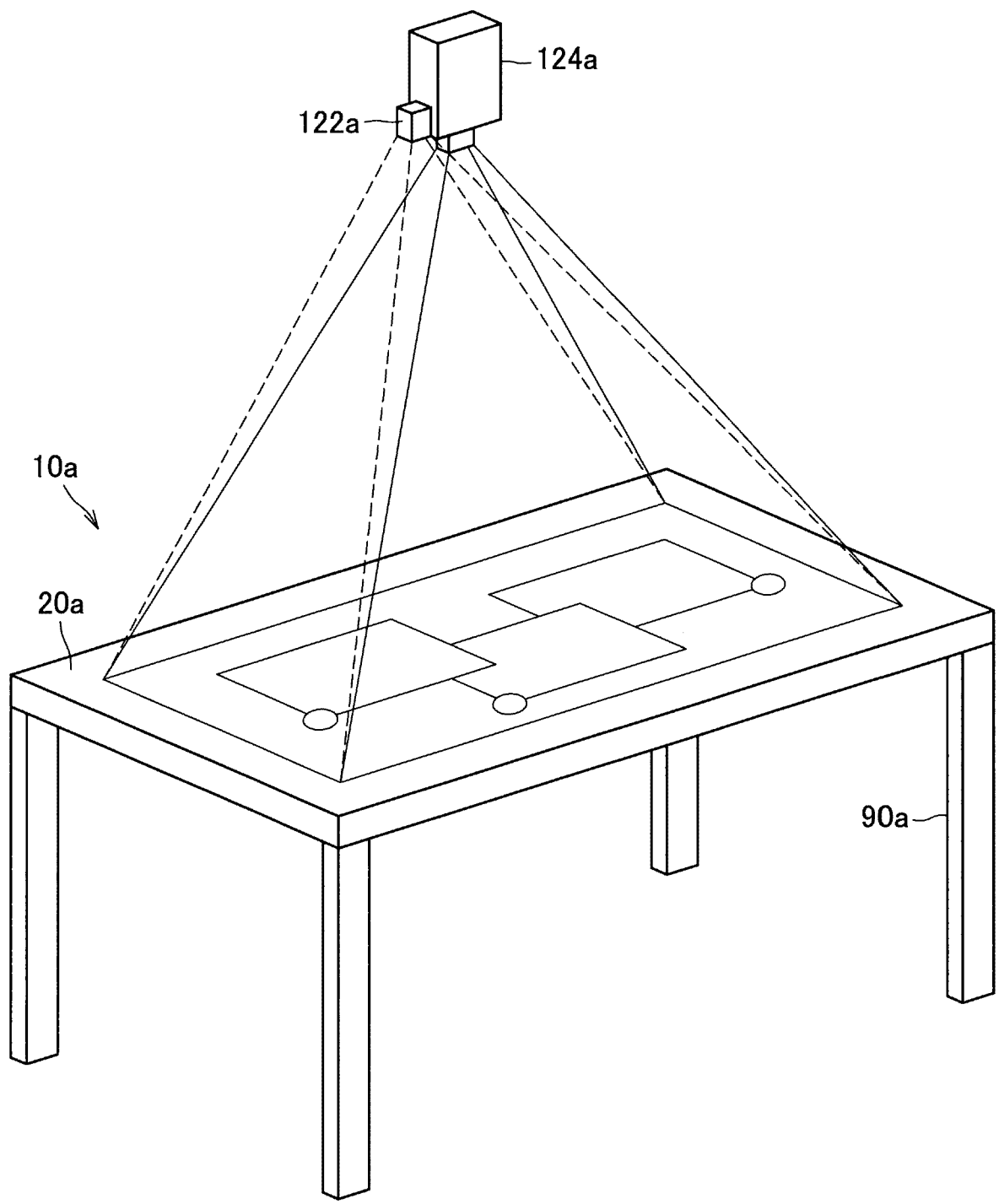
FIG. 1 is an explanatory drawing illustrating a configuration example of an information processing system 10 according to an embodiment of the present disclosure.

Preferred embodiments of the present disclosure will be detailed below with reference to the accompanying drawings. It should be noted that components, described herein and on the drawings, having substantially identical functional configurations are provided with identical reference numbers, and explanation thereof will not be repeated.

In addition, in the present description and the drawings, there is also a case where, in a plurality of components having a substantially identical functional configuration, each of the components is distinguished from the others by different alphabets added to the last part of an identical reference numeral. For example, in a plurality of configurations having a substantially identical functional configuration, each of the configurations is distinguished from the other as follows: a window 30*a*, and a window 30*b*, as necessary. However, in a case where it is not particularly necessary to distinguish a plurality of components having a substantially identical functional configuration, only the identical reference numeral is used. For example, in a case where it is not particularly necessary to distinguish between the window 30*a* and the window 30*b*, the window 30*a* and the window 30*b* are merely referred to as the window 30.

In addition, the "mode for carrying out the invention" will be described according to the order of items listed below.
1. Configuration of Information Processing System
2. Detailed Explanation of Embodiments
3. Hardware Configuration
4. Modified Examples 1. Configuration of Information Processing Systems First of all, a configuration example of the information processing system 10 according to the embodiment of the present disclosure will be described. FIG. 1 is an explanatory drawing illustrating one configuration example of the information processing system 10 according to one embodiment of the present disclosure. Incidentally, in the present description, a system can mean a configuration for executing predetermined processing. The system may be formed by one device, or may include a plurality of devices. In addition, the information processing system 10 according to the present embodiment also has only to be adapted to be capable of executing predetermined processing as the whole information processing system 10, and which configuration in the information processing system 10 should be considered to be one device may be arbitrarily determined.

Referring to FIG. 1, the information processing system 10*a* according to one embodiment of the present disclosure is provided with a sensor unit 122*a*, and a display unit 124*a*.

1-1. Display Unit 124

The display unit 124*a* displays various kinds of information on a table 90*a*. The display unit 124*a* can be a projection unit (projector). As shown in, for example, FIG. 1, the display unit 124*a* can be arranged above the table 90*a* by being suspended from a ceiling so as to be separated from the table 90*a* by a predetermined distance. In this case, the display unit 124*a* projects information on a top surface of the table 90*a*. A method in which information is displayed on the top surface of the table 90*a* from above in this manner is also called "projection type". In addition, there is a case where hereinafter the top surface of the table 90 is referred to as a "screen 20". In addition, the screen 20 is an example of a projection target in the present disclosure. The screen 20 includes a surface (display surface) on which projection by the display unit 124 is performed.

Although details will be described later, the information processing system 10*a* can include a plurality of applications 200. In this case, according to respective controls of the plurality of applications 200, the display unit 124*a* is capable of displaying display objects corresponding to the applications 200. Here, the display object is, for example, a window. However, the display object is not limited to such an example. The display object may be, for example, a predetermined image for accepting various kinds of operations (select, input, etc.) by a user. The predetermined image may include Graphical User Interface (GUI) parts (for example, a button, a slider, a check box, a text box, a software keyboard, etc.). It should be noted that an explanation will be made below by focusing on an example in which a display object is a window.

Incidentally, as shown in, for example, FIG. 2A, a publicly-known window system is designed on the assumption that operations are basically carried out from the front direction of a screen. Therefore, it is difficult for a user to carry out operations from directions other than the front.

Meanwhile, as shown in, for example, FIG. 2B, an information processing system 10*a* according to the present embodiment is capable of displaying, on the display unit 124, display objects (for example, the windows 30) corresponding to the individual applications 200 at arbitrary rotation angles with respect to a reference angle in the screen 20. For example, at least two display objects (for example, the windows 30) can be projected on the screen 20 by the display unit 124 in such a manner that rotation angles of at least the two display objects with respect to the screen 20 differ from each other. As the result, for example, in such a use case where a plurality of users carries out inconsistent operations (for example, carry out noncooperative operations) around the screen 20, the windows 30 can be displayed at rotation angles that are convenient for the plurality of users respectively. Subsequently, the respective users are capable of conveniently operating the windows 30. In addition, between users around the screen 20, interactive operations of, for example, moving a display object toward the other user, or the like, can be realized.

1-2. Sensor Unit 122

A sensor unit 122a includes: a camera that images the table 90a by using, for example, one lens; and a stereo camera that images the table 90a by using two lenses, thereby enabling to record depth-direction information. For example, a visible light camera, an infrared camera or the like can be used as the stereo camera. In addition, the sensor unit 122a may further include a voice input device such as a microphone that picks up voices made by a user, environment sounds in a surrounding environment, or the like.

In a case where the camera that images the table 90a by using one lens is used as the sensor unit 122a, the information processing system 10a is capable of detecting a position of an object (for example, a user's hand, etc.) located on the screen 20 by analyzing an image (imaged image) imaged by the camera. In addition, in a case where the stereo camera is used as the sensor unit 122a, the information processing system 10a is capable of obtaining not only the position information of the object located on the screen 20 but also depth information of the object by analyzing the imaged image imaged by the stereo camera. On the basis of the depth information, the information processing system 10a is capable of detecting that the user's hand has touched, or has been brought close to, the screen 20 in the height direction, and that the user's hand has been released from the screen 20. It should be noted that in the following explanation, touching an operation body (for example, a user's hand, etc.) to the screen 20, or bringing the operation body close to the screen 20, by the user, is also collectively referred to as merely "touch". It should be noted that the sensor unit 122a may have a depth sensor as an alternative to the stereo camera. In this case, the depth sensor is capable of obtaining depth information of an object located on the screen 20.

In the present embodiment, a position of the operation body on the screen 20 is detected on the basis of the imaged image imaged by the sensor unit 122a. In addition, various kinds of information are input on the basis of the detected position of the operation body. In other words, the user is able to perform various kinds of operation inputs by moving the operation body on the screen 20. For example, by detecting that the user's hand has touched the window 30 or the GUI parts, operation inputs for the window 30 or the GUI parts are performed. It should be noted that although an example in which the operation body is a user's hand will be explained as an example in the following explanation, the present invention is not limited to such an example. The operation body may be various operation members such as a stylus.

In addition, the camera included in the sensor unit 122a may be configured to image-capture not only the top surface of the table 90a, but also users existing around the table 90a. In this case, the information processing system 10a is capable of detecting positions of users around the table 90a on the basis of the imaged images imaged by the sensor unit 122a. In addition, the information processing system 10a may perform individual recognition of users by extracting physical features (face, body size, etc.), which enable to identify individual users, on the basis of the imaged image.

It should be noted that the present invention is not limited to the above-described example, and therefore user operation input may be executed by other methods. For example, the sensor unit 122a may be installed as a touch panel on the top surface (screen 20a) of the table 90a. In addition, an operation input of a user may be detected when a finger or the like of the user touches the touch panel. Further, an operation input of a user may be detected by a gesture of the user made toward the camera included in the sensor unit 122a.

1-3. Modified Examples

The configuration of the information processing system 10a according to the present embodiment has been explained above. It should be noted that the configuration of the information processing system according to the present embodiment is not limited to the example shown in FIG. 1, and may be a configuration such as that shown in, for example, FIG. 3 or 4.

1-3-1. Modified Example 1

Figure 3:
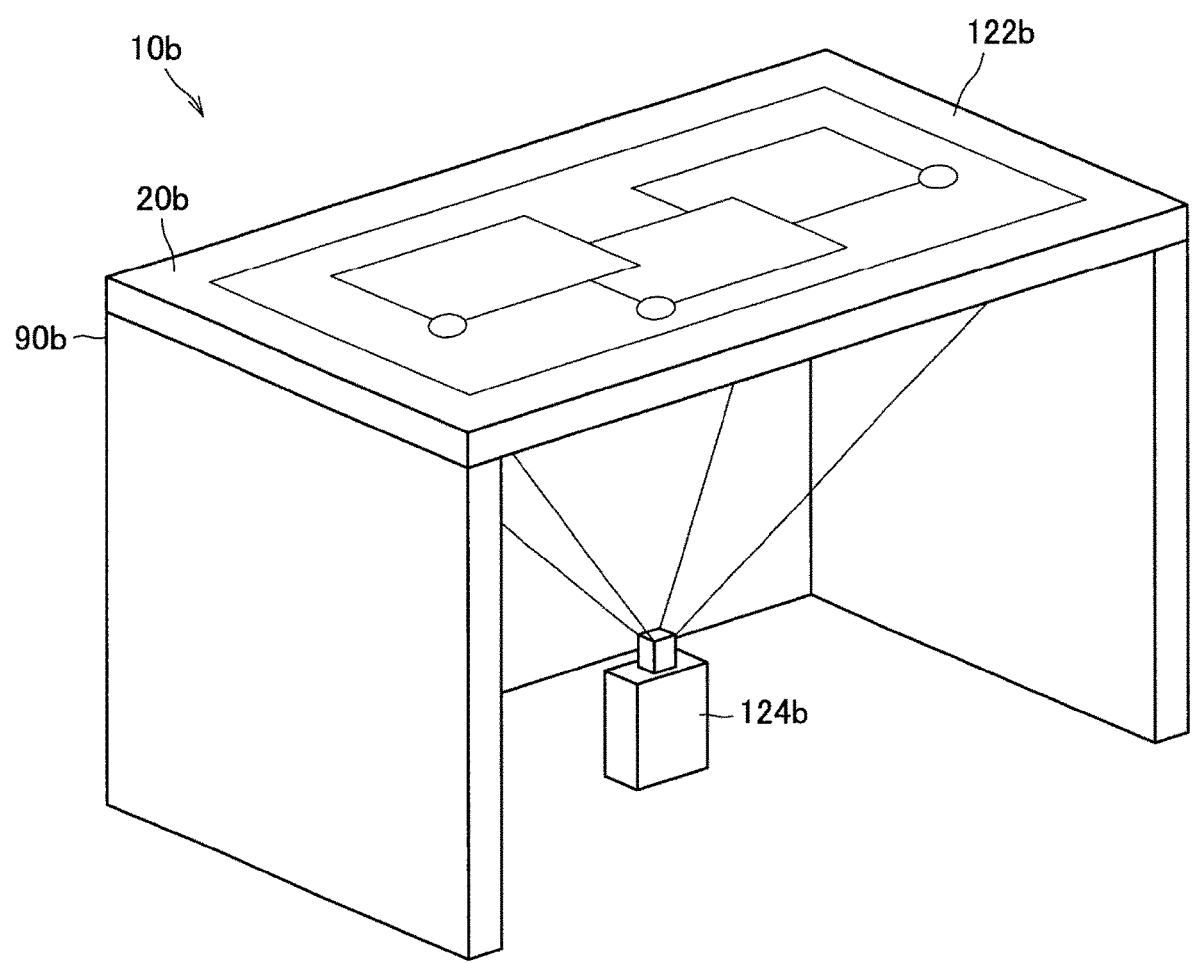
FIG. 3 is an explanatory drawing illustrating another configuration example of the information processing system 10 according to the embodiment.

FIG. 3 is a drawing illustrating another configuration example (information processing system 10b) of the information processing system according to the present embodiment. As shown in FIG. 3, a display unit 124b is installed under the table 90b in the information processing system 10b. The display unit 124b is, for example, a projector, and projects information from the lower side toward a top plate of the table 90b. For example, the top plate of the table 90b is formed by a transparent material, for example, such as a glass plate, and a transparent plastic plate. Subsequently, the information projected by the display unit 124b is displayed on a top surface (screen 20b) of the table 90b (passing through the top plate). A method which information is displayed on the screen 20b by causing the display unit 124b to project the information from under the table 90b in this manner is also called "rear-projection type".

In addition, in the example shown in FIG. 3, the screen 20b (surface) is provided with a sensor unit 122b. The sensor unit 122b is formed by, for example, a touch panel. In this case, by detecting a touch of an operation body to the screen 20b by using the touch panel, an operation input by a user is made. It should be noted that the present invention is not limited to such an example, and therefore, as with the information processing system 10a shown in FIG. 1, the sensor unit 122b may be installed under the table 90b by being isolated from the table 90b. In this case, the sensor unit 122b includes a camera. In addition, the camera is capable of image-capturing the operation body located on the screen 20b through the top plate of the table 90b. Subsequently, a position of the operation body can be detected on the basis of the captured image.

1-3-2. Modified Example 2

Figure 4:
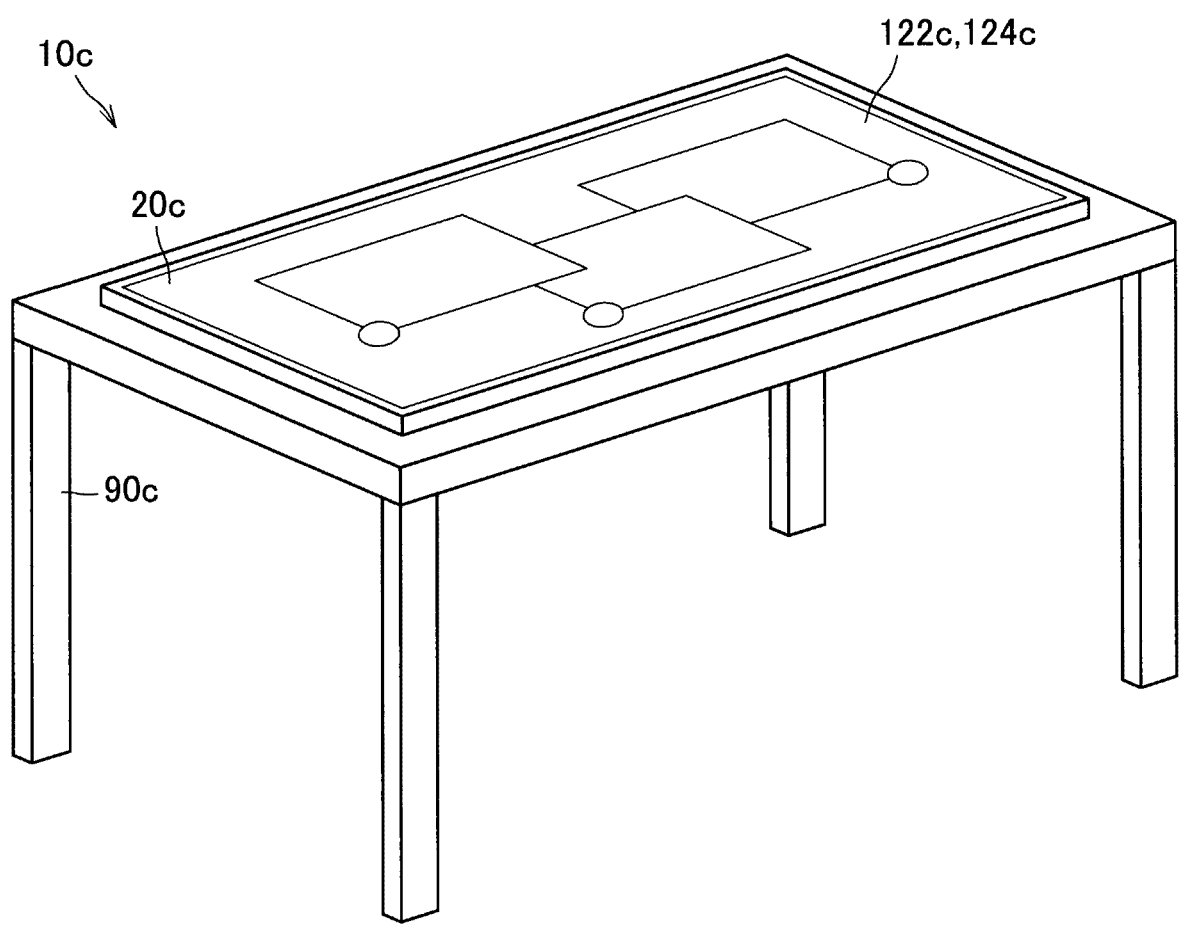
FIG. 4 is an explanatory drawing illustrating still another configuration example of the information processing system 10 according to the embodiment.

FIG. 4 is a drawing illustrating still another configuration example (information processing system 10c) of the information processing system according to the present embodiment. As shown in FIG. 4, in the information processing system 10c, a touch panel type display is installed on the table 90c in a state in which a display surface of the display faces upward. In the information processing system 10c, a sensor unit 122c and a display unit 124c can be integrally formed as the touch panel type display. In other words, various kinds of information are displayed on a display screen (screen 20c) of the display, and by detecting a touch of an operation body to the display screen of the display by using the touch panel, an operation input by a user is made. It should be noted that in the information processing system 10c as well, as with the information processing system 10a shown in FIG. 1, the sensor unit 122c includes a camera, and the camera may be installed above the display unit 124c. In this case, for example, positions of individual users located around the table 90c can be detected on the basis of the captured image image-captured by the camera.

1-4. Organization of Problems

The other configuration examples of the information processing system according to the present embodiment have been explained above. Incidentally, in a scene of making a touch gesture in which a user moves a finger for the window 30 on the screen 20 (for example, swipe, slide, drag, etc.), in the publicly-known technology, there is a possibility that a direction that differs from user's intention will be recognized as an operation direction corresponding to the touch gesture.

Figure 5B:
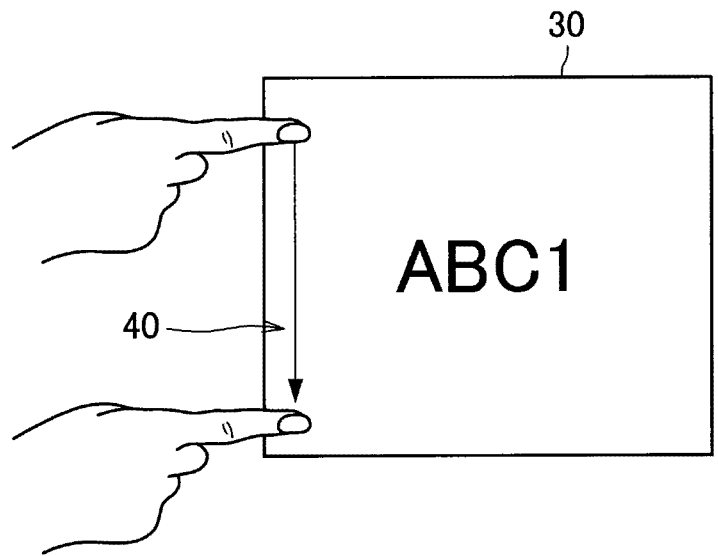
FIG. 5B is an explanatory drawing illustrating an operation direction intended by a user, in a situation shown in FIG. 5A.
Figure 5C:
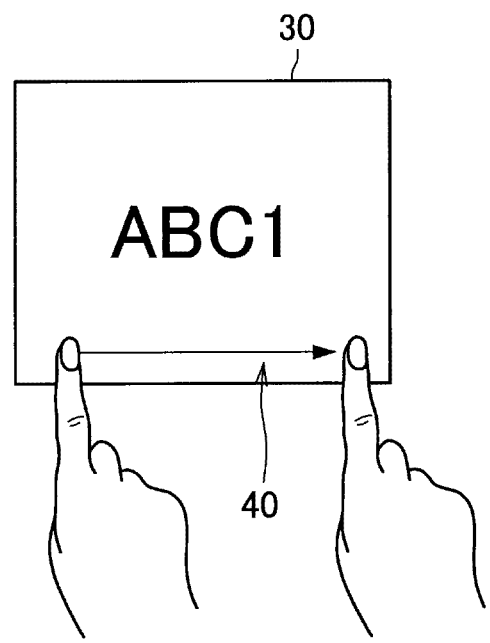
FIG. 5C is an explanatory drawing illustrating an operation direction that is output to an application according to a publicly-known technology, in a situation shown in FIG. 5A.

Here, the contents described above will be described in detail with reference to FIGS. 5A to 5C. FIG. 5A shows an example in which in a case where the window 30 rotates by "90 degrees" with respect to the screen 20, a user makes a touch gesture 40 of moving a finger in the horizontal direction (x-axis direction) shown in FIG. 5A in the window 30. In this case, as shown in FIG. 5B, the user intends to perform scrolling in the vertical direction with respect to the window 30 (scrolling from the "top" to the "bottom" shown in FIG. 5B).

However, in the publicly known technology, platform software (Operating System (OS), middleware or the like) outputs input information called "horizontal scrolling" to an application corresponding to the window 30 without any change. As the result, as shown in FIG. 5C, against user's intention, the application treats scrolling as horizontal scrolling (in other words, scrolling from the "left" to the "right" shown in FIG. 5C) for the application. In other words, the application treats the touch gesture as vertical scrolling with reference to the screen 20 (in other words, scrolling from the "bottom" to the "top" shown in FIG. 5A).

Incidentally, as a method for solving this problem, there can be considered a method in which an application corresponding to the window 30 detects a rotation angle ("90 degrees") of the corresponding window 30 with respect to the screen 20, and changes, in the application, interpretation of an operation direction on the basis of the detected rotation angle. However, this method requires all applications to have such a built-in function, and therefore costs for developing individual applications become high. In addition, if an application that does not have such a built-in function exists, even in the case of the same operation on the screen 20, behavior may differ depending on the window 30, which will cause user's confusion.

Accordingly, considering the above-described circumstance as one viewpoint, the information processing system 10 according to the present embodiment has been devised. The information processing system 10 is capable of obtaining operation information regarding user's operation of a display object (for example, the window 30) displayed on a display surface, and then correcting an operation direction indicated by the operation information on the basis of a rotation angle of the display object with respect to a reference angle on the display surface, and outputting information indicating the corrected operation direction to the application 200 corresponding to the display object. Accordingly, it is possible to correct vector information of an operation input (for example, a gesture input, etc.) by the user in a direction that agrees with user's intention.

Here, the reference angle on the display surface is an internal (logical or relative) reference angle of software included in the information processing system 10, and can be an angle serving as a reference of the "x-axis" (for example, 0 degree with respect to the x-axis). In addition, the rotation angle of the display object can be an angle from the x-axis of the display object with respect to the reference angle on the display surface (in other words, the reference angle in software). In other words, "the reference angle on the display surface" and "the rotation angle of the display object" are both unchangeable even if, for example, the display unit 124a (the projector, etc.) shown in FIG. 1, or the display unit 124c (the touch display) shown in FIG. 4, rotates.

In addition, in the present embodiment, the rotation angle of the display surface can mean a physical spatial angle of the whole projection area projected or displayed on the screen 20. For example, the rotation angle of the display surface is a rotation angle of the display unit 124a (the projector, etc.), or a physical rotation angle or the like of the display unit 124c (the touch display) shown in FIG. 4. In other words, the rotation angle of the display surface can differ from the rotation angle of the display object. For example, in the present embodiment, the rotation angle of the display object changes as a result of adjustment made by a user or the like without depending on the rotation angle of the display surface.

2. DETAILED EXPLANATION OF EMBODIMENTS

2-1. Functional Configuration

Next, a functional configuration according to the present embodiment will be described in detail. FIG. 6 is a functional block diagram illustrating a functional configuration of the information processing system 10 according to the present embodiment. As shown in FIG. 6, the information processing system 10 includes a platform unit 100, a communication unit 120, the sensor unit 122, the display unit 124, and the application 200. It should be noted that contents similar to those described above will not be described again below.

2-1-1. Platform Unit 100

The platform unit 100 can include one or plurality of processing circuits (for example, a Central Processing Unit (CPU) 150, and the like, as described later). The platform unit 100 performs overall control of operation of the information processing system 10. For example, the platform unit 100 realizes functions of an OS, middleware and the like related to the information processing system 10 by using one or plurality of processing circuits. In addition, as shown in FIG. 6, the platform unit 100 includes an obtaining unit 102, a processing unit 104, and a display control unit 106.

2-1-2. Obtaining Unit 102

The obtaining unit 102 obtains operation information regarding user's operation of the window 30 projected on the screen 20 by the display unit 124. Here, the user operation information can include at least one of, for example, a kind of operation method, a display object as an operation target, an operation direction, the operation amount, an operation speed and the like. It should be noted that the kind of operation method can be any method that allows input of direction information, the method including, for example, a touch gesture, operation of an operation unit 50 as described later, and the like. For example, in a case where the operation method is a touch gesture of scrolling, the operation information includes a moving distance (the operation amount) in the x-axis direction and a moving distance in the y-axis direction, and identification information of the window 30 that is an operation target. In addition, in a case where the operation method is a touch gesture of inertial scrolling, the operation information includes a moving speed (operation speed) in the x-axis direction and a moving speed in the y-axis direction, and identification information of the window 30 that is the operation target.

Specific contents of a method for obtaining user operation information will be described below. For example, the obtaining unit 102 obtains user operation information on the basis of a result of sensing a hand of a user located on the screen 20 by the sensor unit 122. As an example, first of all, the obtaining unit 102 obtains an image, which has been obtained by image-capturing by the sensor unit 122, as sensor data from the sensor unit 122 by performing receiving, read processing or the like. Next, the obtaining unit 102 subjects the image to image recognition, thereby recognizing the touch gesture on the screen 20. Subsequently, the obtaining unit 102 obtains a result of the recognition as operation information.

It should be noted that the image recognition may be performed by the sensor unit 122 instead of being performed by the obtaining unit 102. Alternatively, the corresponding image may be transmitted, via a communication network (for example, Internet, various Local Area Networks (LANs), etc.), to an external device (a server or the like) that is capable of communicating with the communication unit 120 as described later, and the external device may subject the image to image recognition. In this case, the obtaining unit 102 is capable of obtaining a result of the image recognition from the external device.

Figure 8:
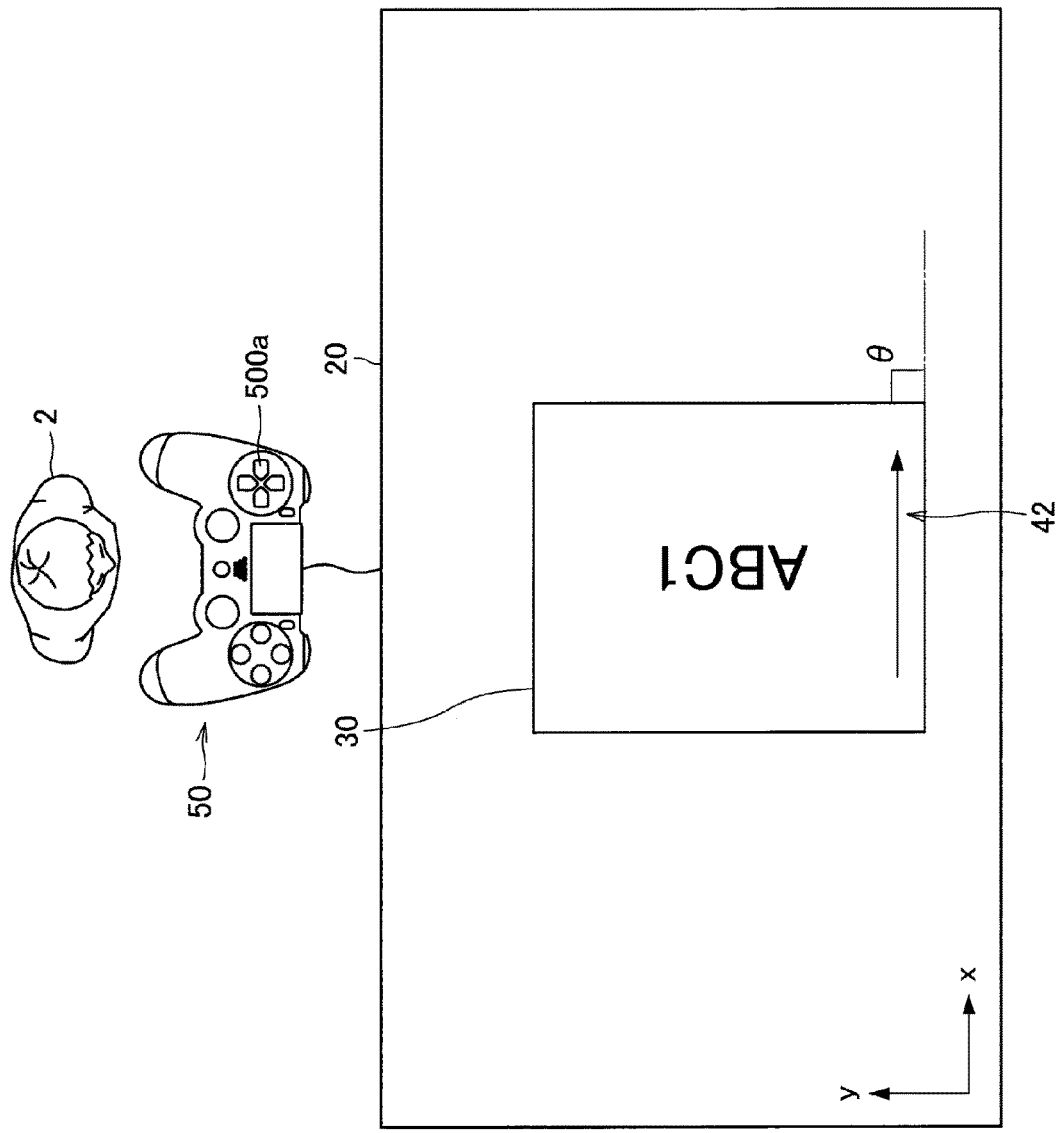
FIG. 8 is an explanatory drawing illustrating a correction example of an operation direction with respect to an operation unit 50 according to the embodiment.

In addition, as shown in FIG. 8, in a case where operation is performed for an operation unit 50 (for example, a controller, a joystick, a keyboard, etc.) that is separated from the screen 20, the obtaining unit 102 receives user operation information from the operation unit 50, thereby obtaining the user operation information. It should be noted that the operation unit 50 can be adapted to be capable of communicating with the communication unit 120 through, for example, the above-described communication network.

Figure 9:
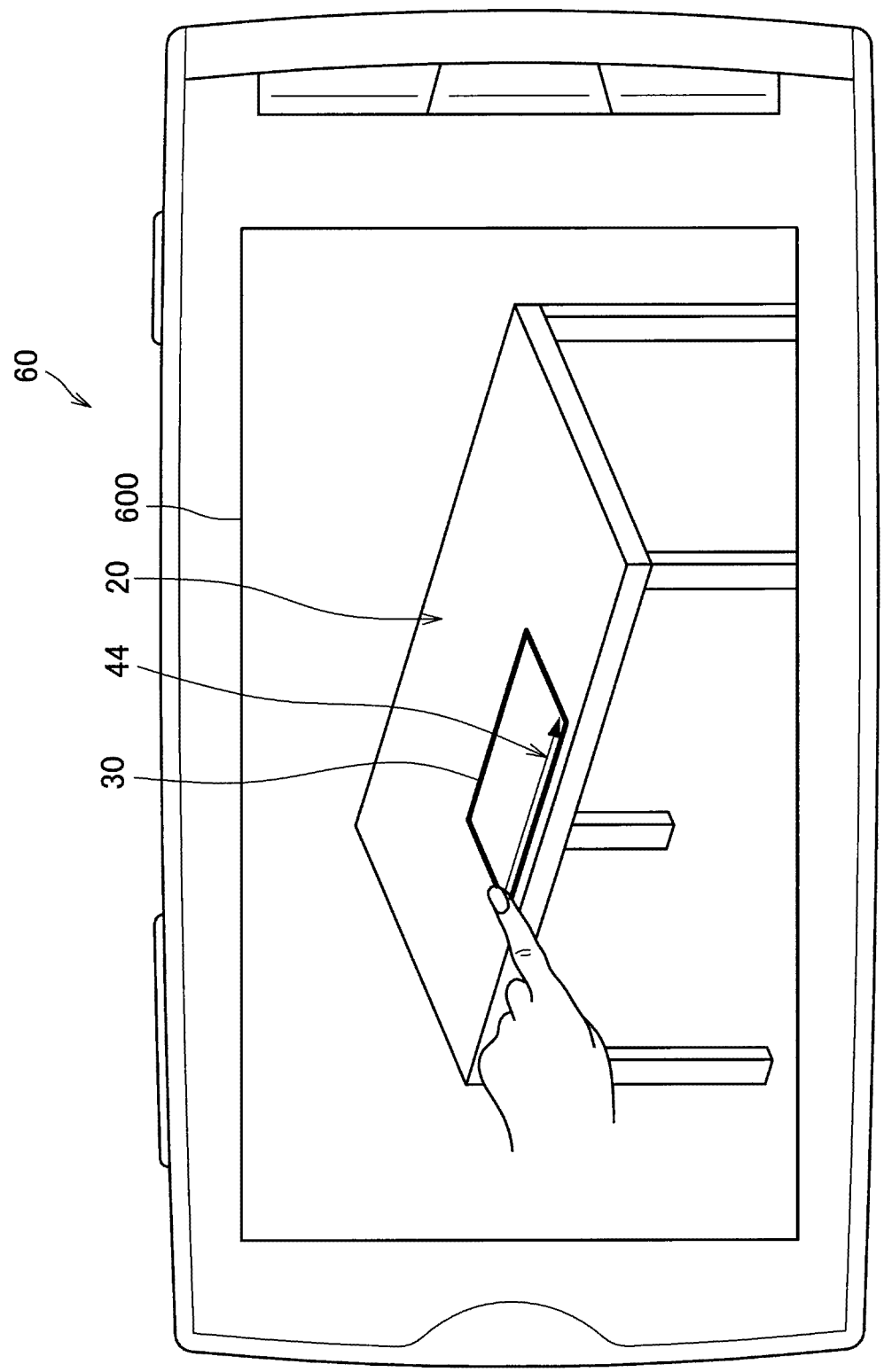
FIG. 9 is an explanatory drawing illustrating a correction example of an operation direction with respect to an imaged image obtained by image-capturing a screen 20 according to the embodiment.

In addition, as shown in FIG. 9, in a case where operation is performed for an information processing terminal 60 that is capable of communicating with the communication unit 120 through, for example, the above-described communication network, the obtaining unit 102 receives user operation information from the information processing terminal 60, thereby obtaining the user operation information. For example, an image obtained by image-capturing the screen 20 is transmitted to the information processing terminal 60, and subsequently the information processing terminal 60 is capable of displaying the image in this case, for example, when a touch operation is performed for the image that is displayed on an operation display unit 600 (for example, a touch display, etc.) of the information processing terminal 60, the obtaining unit 102 receives operation information indicating contents of the touch operation from the information processing terminal 60, which enables the obtaining unit 102 to obtain the operation information.

2-1-3. Processing Unit 104

2-1-3-1. Correction of Operation Direction

Correction Example 1

The processing unit 104 corrects an operation direction indicated by the operation information on the basis of a rotation angle of the window 30 as an operation target, with respect to a reference angle in the screen 20 (in more detail, in a display surface of the screen 20), the rotation angle being indicated by the operation information obtained by the obtaining unit 102. For example, the processing unit 104 corrects the operation direction on the basis of a kind of operation indicated by the obtained operation information, and on the basis of a rotation angle of the window 30 as the operation target with respect to the reference angle in the screen 20. As an example, in a case where the kind of the operation is a touch gesture of scrolling, the processing unit 104 corrects the operation direction on the basis of a moving distance in the x-axis direction and a moving distance in the y-axis direction indicated by the operation information, and a rotation angle of the window 30 as the operation target with respect to the screen 20.

Figure 7B:
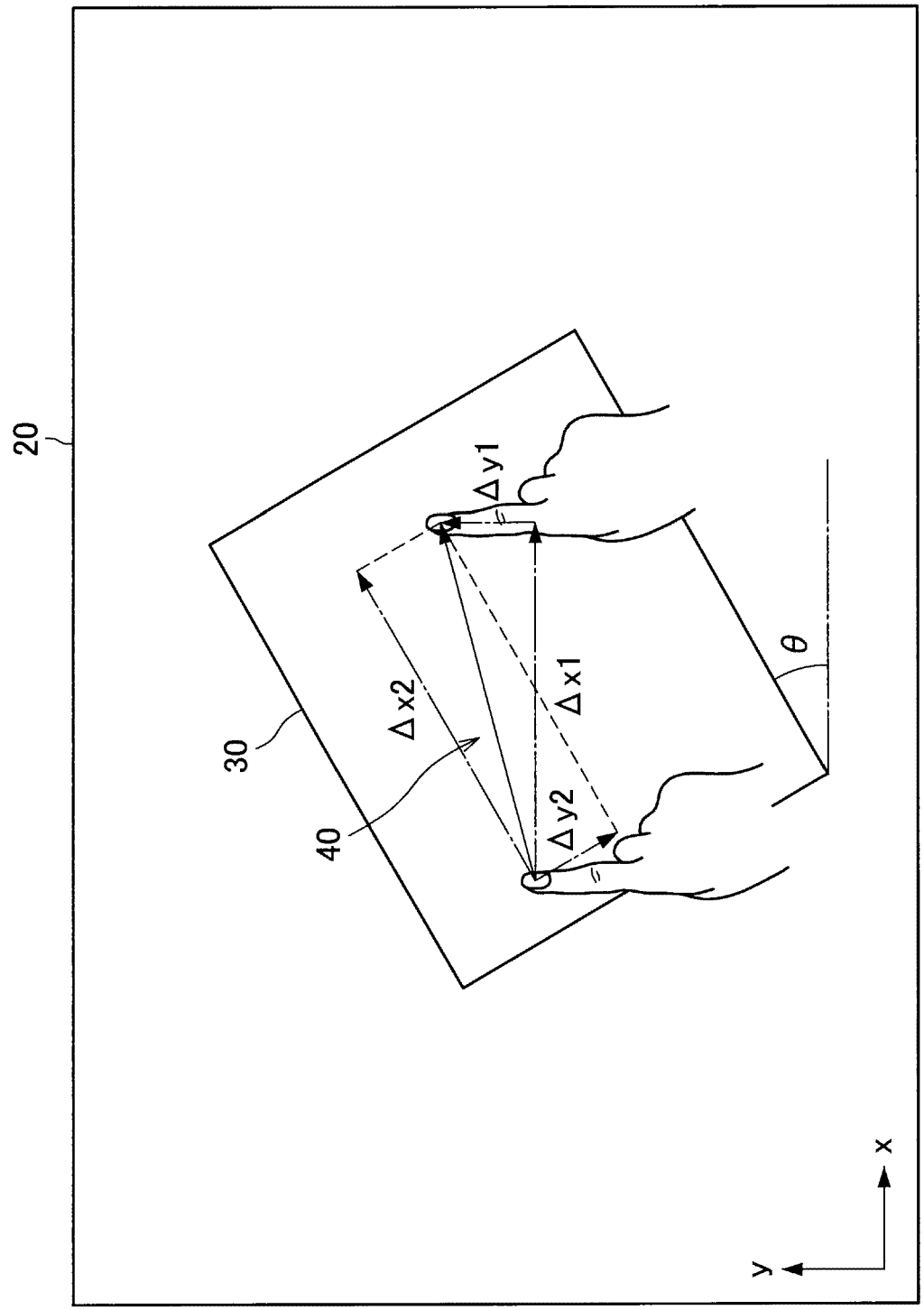
FIG. 7B is an explanatory drawing illustrating a correction example of an operation direction of a touch gesture of scrolling according to the embodiment.

Here, a correction example of an operation direction in a case where a touch gesture 40 of scrolling is made for the window 30 will be described in detail with reference to FIGS. 7A and 7B. Incidentally, FIG. 7A shows an example in which the window 30 rotates only by an angle θ with respect to the x-axis of the screen 20. In addition, FIG. 7A shows an example in which a moving distance in the x-axis direction corresponding to scrolling 40 is Δx1, and a moving distance in the y-axis direction corresponding to the scrolling 40 is Δy1.

In this case, as shown in FIG. 7B, the processing unit 104 corrects the moving distance in the x-axis direction from Δx1 to Δx2 by using, for example, the following mathematical expression (1). Similarly, the processing unit 104 corrects the moving distance in the y-axis direction from Δy1 to Δy2 by using the following mathematical expression (2).

[Mathematical Expressions 1]

$$\Delta x2 = \cos\theta \cdot \Delta x1 + \sin\theta \cdot \Delta y1 \quad (1)$$

$$\Delta y2 = -\sin\theta \cdot \Delta x1 + \cos\theta \cdot \Delta y1 \quad (2)$$

Correction Example 2

In addition, the processing unit 104 is also capable of correcting the operation direction indicated by the operation information on the basis of whether or not operation indicated by the operation information is a direct operation of the window 30. For example, in a case where the operation indicated by the operation information is not a direct operation of the window 30 (in other words, in the case of indirect operation), the processing unit 104 corrects the operation direction on the basis of a rotation angle of the window 30 with respect to the screen 20, and positional relationship between the screen 20 and the user. In addition, in a case where the operation indicated by the operation information is a direct operation of the window 30, the processing unit 104 corrects the operation direction on the basis of only the rotation angle of the window 30 with respect to the screen 20 (without using the positional relationship between the screen 20 and the user). Here, the direct operation of the window 30 includes, for example, a touch gesture on the screen 20, or the like. In add on, the indirect operation of the window 30 includes, for example, input of direction information into the operation unit 50 (for example, operation of a key, a button, a stick, or the like included in the operation unit 50, or the like).

Here, referring to FIG. 8, the contents described above will be described in more detail. FIG. 8 is an explanatory drawing illustrating an example in which a user 2 performs operation (having direction information) for the window 30 by using the operation unit 50 (in other words, an example in which indirect operation is performed). It should be noted that FIG. 8 shows an example in which the obtaining unit 102 has obtained operation information indicating that a left key 500a (among direction keys 500 included in the operation unit 50) has been pressed.

In this case, the processing unit 104 corrects the operation direction indicated by the operation information on the basis of a rotation angle of the window 30 (in the example shown in FIG. 8, "90 degrees") with respect to the screen 20, and a result of detecting the positional relationship between the screen 20 and the user 2. As the result, as shown in FIG. 8, the "left" direction with reference to, for example, a direction in which the user 2 faces ("downward" direction in FIG. 8) becomes an operation direction 42 after the correction.

Correction Example 3

In addition, in a case where the operation indicated by the operation information is operation of a captured image (camera image) obtained by image-capturing the screen 20, the processing unit 104 is also capable of correcting the operation direction indicated by the operation information further on the basis of a result of subjecting the captured image to object recognition. In addition, in this case, the processing unit 104 is also capable of correcting the operation amount indicated by the operation information on the basis of the result of subjecting the captured image to the object recognition. In other words, the processing unit 104 is capable of correcting magnitude of a vector (corresponding to the corresponding operation) in consideration of perspective.

For example, as shown in FIG. 9, the captured image obtained by image-capturing the screen 20 is transmitted to the information processing terminal 60, and subsequently the operation display unit 600 of the information processing terminal 60 is capable of displaying the captured image. In this case, the processing unit 104 corrects the operation direction and the operation amount indicated by the operation information on the basis of a result of recognizing the screen 20 included in the captured image, and the operation information obtained by the obtaining unit 102. For example, first of all, the processing unit 104 subjects the captured image to object recognition. Next, the processing unit 104 identifies a display area of the window 30 in the captured image displayed on the operation display unit 600. In addition, the processing unit 104 corrects the operation direction and the operation amount indicated by the operation information on the basis of the relationship between the display area of the window 30 and the operation (for example, a touch operation of the operation display unit 600, operation of the operation unit (a key, a stick, etc.) included in the information processing terminal 60, and the like) indicated by the operation information.

2-1-3-2. Change Related to Window

In addition, in a case where the operation indicated by the operation information obtained by the obtaining unit 102 is a touch gesture made for the window 30, the processing unit 104 determines, on the basis of a position of the touch gesture, either to correct the operation direction with respect to the corresponding window 30 or to change settings related to the corresponding window 30. For example, on the basis of whether or not the position of the touch gesture is inside a changing area in the window 30, the processing unit 104 corrects the operation direction with respect to the corresponding window 30 or changes the settings related to the corresponding window 30. Here, the changing area is an example of a predetermined area in the present disclosure. The changing area may be, for example, an area inside the window 30, the area falling within a predetermined distance from the outer periphery of the window 30, an area outside the window 30, the area falling within a predetermined distance from the outer periphery of the window 30, or a range that includes both of the areas. In addition, the settings related to the window 30 include, for example, a rotation angle of the window 30 with respect to the screen 20, a position of the window 30 with respect to the screen 20, a display size of the window 30, or the like.

Figure 10:
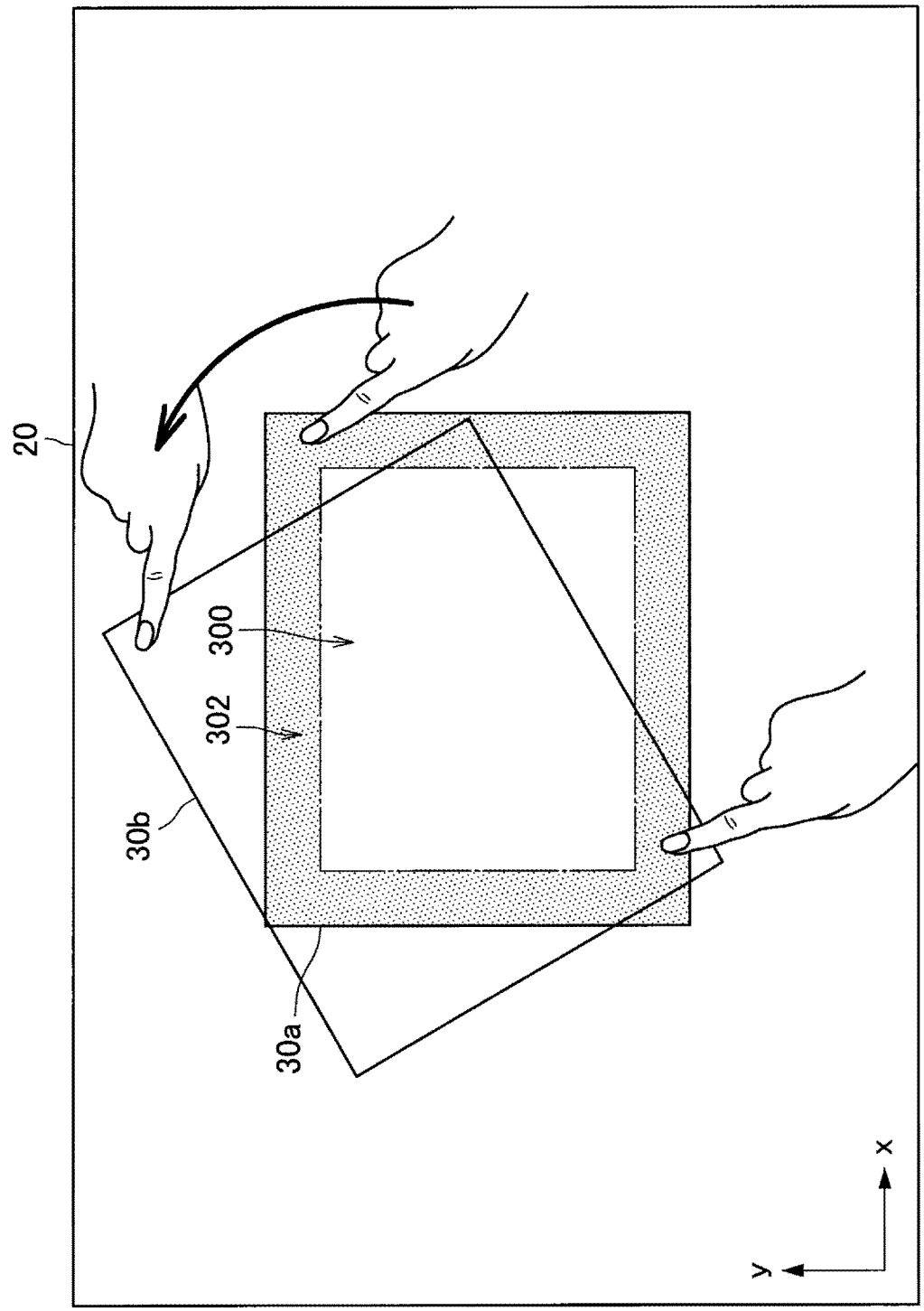
FIG. 10 is an explanatory drawing illustrating an example of a touch gesture in a changing area according to the embodiment.

As shown in, for example, FIG. 10, in a case where a position of the touch gesture is inside the changing area 302 of the window 30, the processing unit 104 changes a rotation angle of the corresponding window 30 on the basis of the touch gesture.

Figure 11:
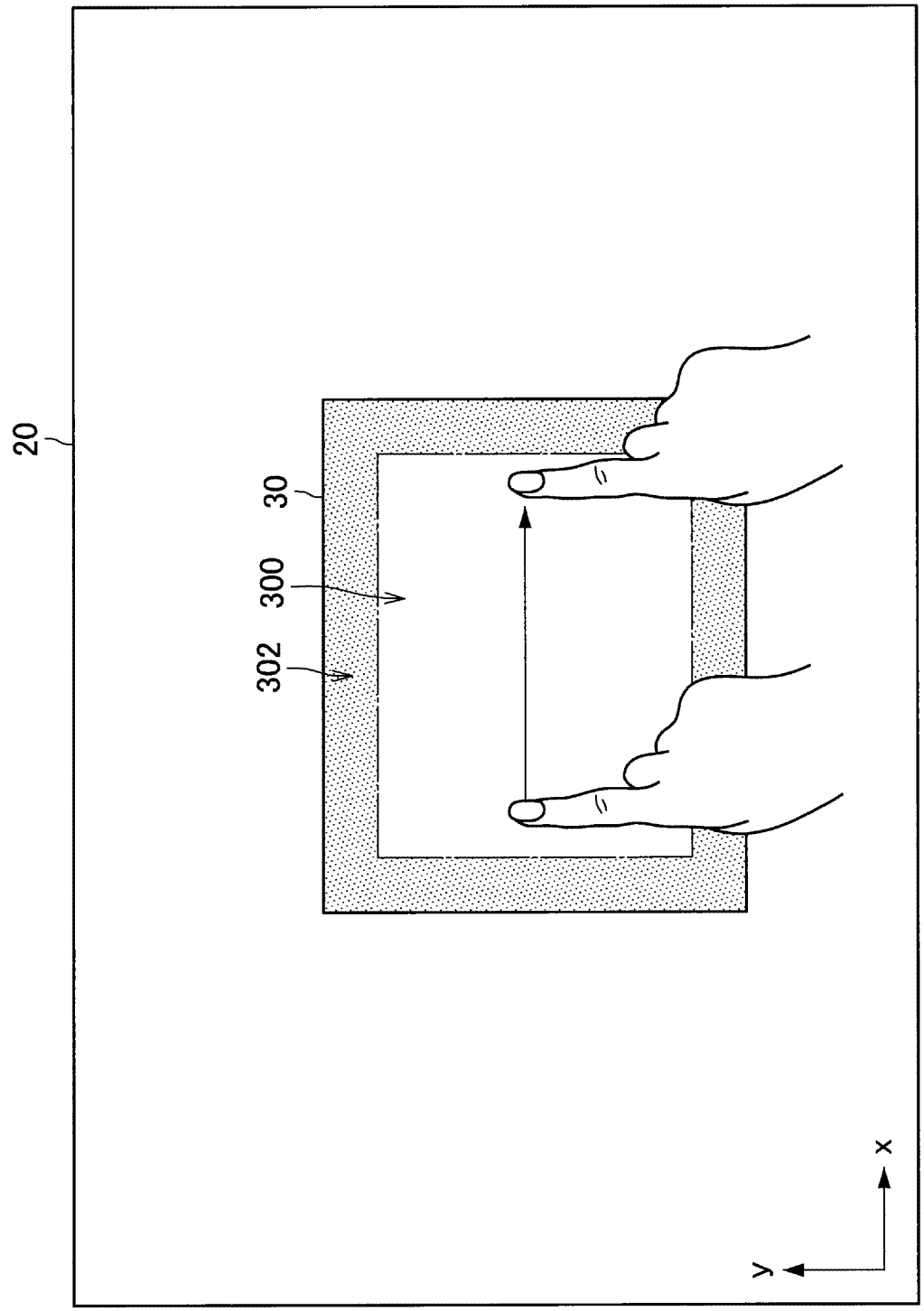
FIG. 11 is an explanatory drawing illustrating an example of a touch gesture in an area other than the changing area according to the embodiment.

In addition, as shown in FIG. 11, in a case where the position of the touch gesture is inside an area 300 other than the changing area of the window 30, the processing unit 104 corrects the operation direction with respect to the corresponding window 30 on the basis of the touch gesture (as described above).

2-1-3-3. Output of Correction Result

In addition, the processing unit 104 outputs information of a result of the correction (hereinafter referred to as "information of correction result") to the application 200 corresponding to the window 30 that is the operation target. Here, the information of correction result can include the corrected operation direction, the corrected operation amount and the like. Accordingly, the corresponding application 200 is able to execute processing corresponding to the result of the correction.

2-1-4. Display Control Unit 106

The display control unit 106 performs the control of projection by the display unit 124. For example, while settings (a rotation angle, a position, or a size, etc.) related to the window 30 are changed by the processing unit 104 on the basis of a touch gesture of a user, the display control unit 106 changes a display mode of the corresponding window 30 from a standard display mode to another display mode. For example, only while the settings related to the window 30 are changed, the display control unit 106 may change a display color of the corresponding window 30 itself, may increase transmittance, or may cause a frame of the corresponding window 30 to light up. Alternatively, only while the settings related to the window 30 are changed, as shown in, for example, FIG. 10, the display control unit 106 may further display an outline of the corresponding window 30 on the display unit 124 so as to move the outline, or so as to change the size, in response to the change. According to these display examples, the information processing system 10 (in more detail, the processing unit 104) is capable of informing the user who is operating the window 30 of whether or not settings related to the window 30 are currently being performed, and therefore user's convenience is improved.

2-1-5. Communication Unit 120

The communication unit 120 transmits/receives information to/from other devices. For example, the communication unit 120 receives user operation information from the operation unit 50 and the information processing terminal 60.

2-1-6. Application 200

The application 200 executes predetermined processing according to information related to a correction result output by the processing unit 104. In addition, the application 200 causes at least one window 30 corresponding to the application 200 to be displayed on the display unit 124. It should be noted that the application 200 may be executed by a processor or the like that differs from the processing unit 104. Alternatively, in a case where the processing unit 104 is also capable of executing processing other than the processing as the platform unit 100, the processing unit 104 may execute processing of the application 200.

2-2. Process Flow

Figure 12:
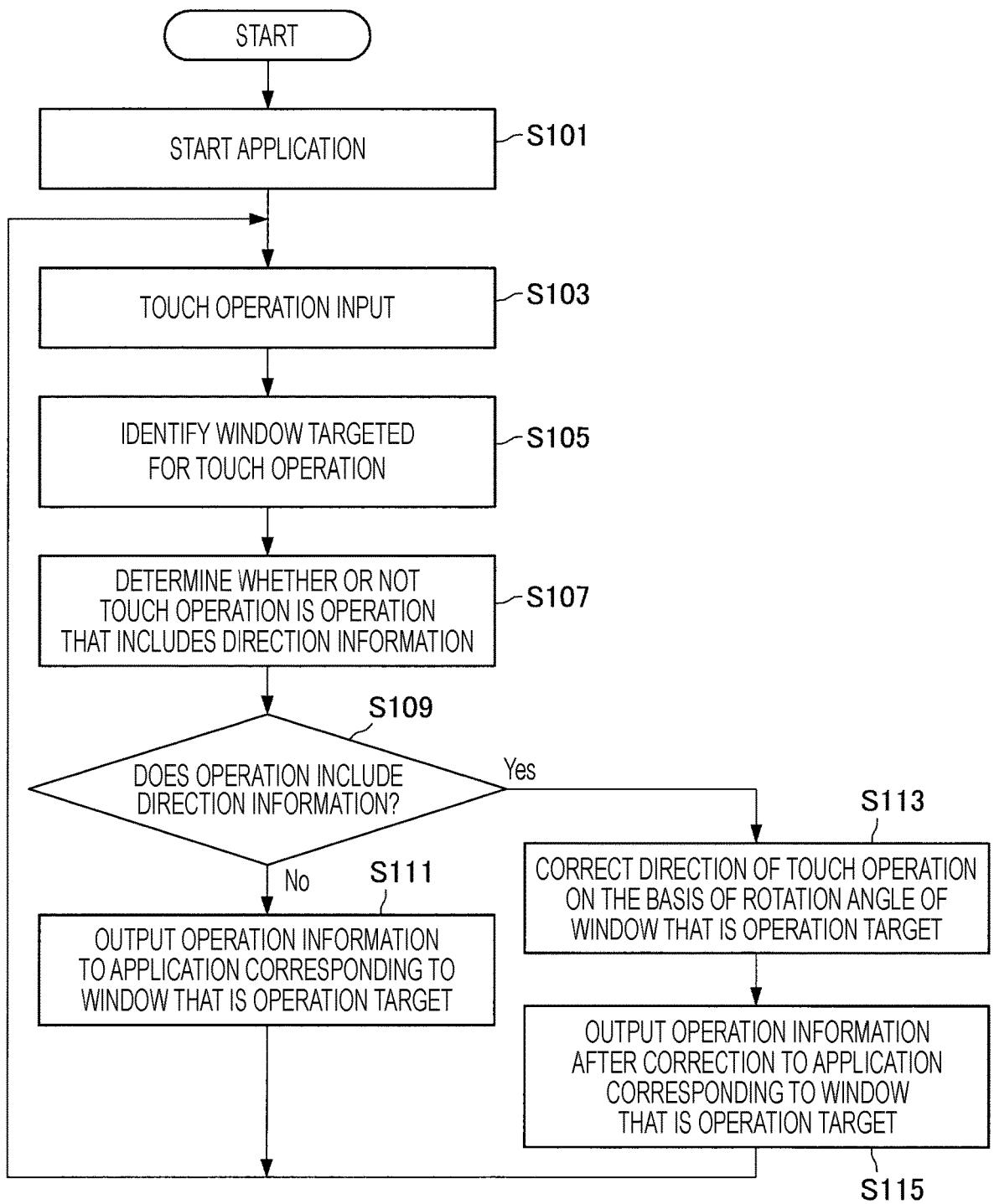
FIG. 12 is a flowchart illustrating a process flow according to the embodiment.

The functional configuration according to the present embodiment has been explained above. Next, a process flow according to the present embodiment will be described with reference to FIG. 12. FIG. 12 is a flowchart illustrating a process flow according to the present embodiment. Incidentally, an example of a process flow in a scene in which a user performs a touch operation of the screen 20 will be described below.

As shown in FIG. 12, first of all, at least one application 200 starts, for example, on the basis of input by a user, or the like. Subsequently, the display unit 124 projects the window 30 corresponding to the application 200 on the screen 20 according to the control of the application 200 that has started (S101).

After that, the user performs a desired touch operation of any of the windows 30 projected on the screen 20. The obtaining unit 102 then obtains operation information indicating contents of the touch operation (S103). Here, obtaining can include: processing of receiving, for example, operation information; processing of generating operation information on the basis of sensor information; processing of reading operation information temporarily recorded on a storage medium such as a memory; and/or the like.

Subsequently, the processing unit 104 identifies the window 30 targeted for the touch operation on the basis of the operation information (S105).

Subsequently, the processing unit 104 determines whether or not the touch operation is operation that includes direction information (S107). In a case where the touch operation is operation that does not include direction information (S109: No), the processing unit 104 outputs the operation information to the application 200 corresponding to the window 30 identified in the S105 without any change (S111). Subsequently, processing after the S103 is repeated.

Meanwhile, in a case where the touch operation is operation that includes direction information (S109: Yes), the processing unit 104 corrects an operation direction indicated by the operation information obtained in the S103 on the basis of a rotation angle with respect to the screen 20 of the window 30 identified in the S105 (S113).

Subsequently, the processing unit 104 outputs, to the application 200 corresponding to the window 30, operation information in which a result of the correction in the S113 is reflected (S115). Subsequently, processing after the S103 is repeated.

2-3. Effects

2-3-1. Effect 1

As described above, the platform unit 100 according to the present embodiment obtains operation information regarding user's operation of the window 30 displayed on a display surface, and then corrects an operation direction indicated by the operation information on the basis of a rotation angle of the window 30 with respect to a reference angle on the display surface, and outputs information indicating the corrected operation direction to the application 200 corresponding to the window 30. Therefore, the operation direction that agrees with user's intention can be output to the application 200 corresponding to the window 30 that is the operation target.

As the result, for example, in an apparatus (the table 90 shown in FIGS. 1, 3 and 4, etc.) that allows a plurality of users to operate from different directions respectively, the users can perform operation inputs without feeling a sense of difficulty or discomfort. Therefore, usability of the apparatus can be enhanced.

2-3-2. Effect 2

In addition, according to the present embodiment, not the application 200 but the platform unit 100 realizes the correction of the operation direction. Therefore, it is not necessary to build a special function into the application 200. Therefore, creation of the application 200 requires unnecessary costs. In addition, behavior does not vary among the applications 200, and therefore unified operational feeling can be realized.

In addition, for similar reasons, the existing application 200 can be used as it is in the information processing system 10. Moreover, in future, even in a case where an apparatus having a new form comes in, the platform unit 100 is capable of performing correction corresponding to the form of the apparatus, and therefore it is not necessary to modify the existing application 200.

3. HARDWARE CONFIGURATION

Next, a hardware configuration of the information processing system 10 according to the present embodiment will be described with reference to FIG. 13. As shown in FIG. 13, the information processing system 10 is provided with the CPU 150, a Read Only Memory (ROM) 152, a Random Access Memory (RAM) 154, a bus 156, an interface 158, an input device 160, an output device 162, a storage device 164, and a communication device 166.

The CPU 150 functions as a computation processing device and a control device, and controls the overall operation in the information processing system 10 according to various kinds of programs. In addition, the CPU 150 realizes a function of the platform unit 100 in the information processing system 10. Incidentally, the CPU 150 is formed by a processor such as a microprocessor.

The ROM 152 stores, for example, programs used by the CPU 150, and control data such as computation parameters.

The RAM 154 temporarily stores, for example, programs executed by the CPU 150, or the like.

The bus 156 is formed by a CPU bus and the like. This bus 156 mutually connects the CPU 150, the ROM 152 and the RAM 154.

The interface 158 connects the input device 160, the output device 162, the storage device 164 and the communication device 166 to the bus 156.

The input device 160 includes, for example, an input means for inputting information by a user, such as a touch panel, a button, a switch, a dial, a lever, or a microphone; an input control circuit that generates an input signal on the basis of input by a user, and outputs the input signal to the CPU 150; and the like.

The output device 162 includes, for example, a display device such as a projector, a liquid crystal display device, an Organic Light Emitting Diode (OLED) device, or a lamp. In addition, the output device 162 includes an audio output device such as a speaker. The output device 162 can realize a function of the display unit 124 in the information processing system 10.

The storage device 164 is a device for storing data. The storage device 164 includes, for example, a storage medium, a recording device for recording data on the storage medium, a readout device for reading data from the storage medium, a deletion device for deleting data recorded on the storage medium, or the like.

The communication device 166 is, for example, a communication interface that is used for connecting to a communication network such as Internet, and is formed by a communication device or the like. In addition, the communication device 166 may be a wireless LAN supported communication device, a Long Term Evolution (LTE) supported communication device, or a wired communication device that performs wired communication. This communication device 166 can realize a function of the communication unit 120 in the information processing system 10.

4. MODIFIED EXAMPLES

The preferable embodiments of the present disclosure have been described in detail as above with reference to the accompanying drawings. However, the present disclosure is not limited to the above-described examples. It is clear that persons who have ordinary skill in the technical field to which the present disclosure belongs can conceive of various correction examples or modification examples within the category of the technical idea set forth in the claims. It should be understood that, as a matter of course, these examples also belong to the technical range of the present disclosure.

4-1. Modified Example 1

For example, in the embodiments described above, the example in which the projection target in the present disclosure is the screen 20 has been described. However, the present invention is not limited to such an example. The projection target may be a three-dimensional object targeted for the projection by the display unit 124.

4-2. Modified Example 2

In addition, in the embodiments described above, the example in which the display unit 124 projects the image on the screen 20 has been described. However, the present invention is not limited to such an example. For example, a head-mount type (for example, a glass type, etc. display is used as the display unit 124, and the platform unit 100 or each of the applications 200 may cause the display unit 124 to display a display object such as the window 30. In this case, the display unit 124 may be a transmission-type display, or a non-transmission type display. In the latter case, video images in front of the display unit 124 can be captured by a camera attached to the display unit 124. In addition, the platform unit 100 or each of the applications 200 may cause the display unit 124 to display the images obtained by image-capturing by the camera with the displayed object superimposed on the images.

4-3. Modified Example 3

In addition, the device (the information processing device) that includes the platform unit 100 according to the present embodiment may include one or more of the communication unit 120, the sensor unit 122, and the display unit 124. For example, the information processing device may be a projector unit that includes the platform unit 100, and the display unit 124 (the projection unit).

Alternatively, the information processing device may be constructed integrally with the table 90. Alternatively, the information processing device may be a device that is connected to at least one of the communication unit 120, the sensor unit 122 and the display unit 124 through, for example, the communication network. For example, the information processing device may be a server, a general-purpose Personal Computer (PC), a tablet-type terminal, a game machine, a portable telephone such as a smart phone, a portable music player, a wearable device, or a robot, the wearable device being, for example, a Head Mounted Display (HMD), an Augmented Reality (AR) glass, a smart watch, or the like.

In addition, the application 200 may be implemented in the information processing device, or may be implemented in another device that is capable of communicating with the information processing device.

4-4. Modified Example 4

In addition, each step in the above-described process flow is not always required to be executed according to the above-described order. For example, each step may be executed with the order changed as appropriate. Moreover, each step may be executed partially in a parallel or individual manner instead of being executed in a time-series manner. In addition, a part of the above-described steps may be omitted, or another step may be added to the above-described steps.

Moreover, according to the above-described embodiment, a computer program that causes hardware such as the CPU 150, the ROM 152, and the RAM 154 to serve a function equivalent to that of each configuration of the information processing system 10 (in particular, the platform unit 100) according to the above-described embodiment can also be provided. Further, a recording medium having a computer program recorded thereon is also provided.

Furthermore, the effects described in the present description are to be construed as merely descriptive or illustrative, and are not limitative. In other words, the technology according to the present disclosure can achieve, together with the above effects or instead of the above effects, other effects apparent to a person skilled in the art from the statement of the present description.

It should be noted that the following configurations also belong to the technical range of the present disclosure.

(1) An information processing system comprising:

an obtaining unit that obtains operation information regarding user's operation of a display object displayed on a display surface; and a processing unit that corrects an operation direction indicated by the operation information on the basis of a rotation angle of the display object with respect to a reference angle on the display surface, and that outputs information indicating the corrected operation direction to an application corresponding to the display object, in which a rotation angle of the display object differs from a rotation angle of the display surface.

(2) The information processing system set forth in the preceding (1), in which the display object is projected, by a projection unit, on a projection target that includes the display surface.

(3) The information processing system set forth in the preceding (2), in which the display object is a window.

(4) The information processing system set forth in the preceding (2), in which at least two display objects are projected on the projection target by the projection unit, and respective rotation angles of the at least two display objects with respect to the reference angle on the display surface differ from each other.

(5) The information processing system set forth in the preceding (4) in which the processing unit corrects the operation direction on the basis of the rotation angle of the display object that is an operation target indicated by the operation information, the display object being selected from among the at least two display objects, and outputs information indicating the corrected operation direction to an application corresponding to the display object that is the operation target.

(6) The information processing system set forth in any one of the preceding (2) to (5), in which the processing unit further corrects the operation direction on the basis of whether or not operation indicated by the operation information is direct operation of the display object.

(7) The information processing system set forth in the preceding (6), in which, in a case where the operation indicated by the operation information is indirect operation of the display object, the processing unit further corrects the operation direction on the basis of a positional relationship between the projection target and the user.

(8) The information processing system set forth in the preceding (7), in which the indirect operation of the display object includes input of direction information into an operation unit.

(9) The information processing system set forth in any one of the preceding (6) to (8), in which the direct operation of the display object includes a touch gesture on the projection target.

(10) The information processing system set forth in any one of the preceding (2) to (5), in which a captured image obtained by image-capturing the projection target is transmitted to an information processing terminal having an operation display unit, the operation information indicates operation of the captured image displayed on the operation display unit, the obtaining unit obtains the operation information from the information processing terminal, and the processing unit further corrects the operation direction on the basis of a result of subjecting the captured image to object recognition.

(11) The information processing system set forth in the preceding (10), in which the processing unit further corrects the operation amount indicated by the operation information on the basis of the result of subjecting the captured image to the object recognition, and outputs information indicating the corrected operation amount to an application corresponding to the display object.

(12) The information processing system set forth in the preceding (3), in which the operation information indicates a touch gesture on the window, and the processing unit further determines, on the basis of whether or not a position of the touch gesture is in a predetermined area in the window, either to correct the operation direction or to change settings related to the window.

(13) The information processing system set forth in the preceding (12), in which the settings related to the window include a rotation angle of the window with respect, to the projection target.

(14) The information processing system set forth in the preceding (13), in which in a case where the position of the touch gesture is in the window other than the predetermined area, the processing unit corrects the operation direction on the basis of a rotation angle of the window with respect to the projection target.

(15) The information processing system set forth in the preceding (13) or (14), in which in a case where the position of the touch gesture is in the predetermined area, the processing unit changes the rotation angle of the window with respect to the projection target on the basis of the touch gesture.

(16) The information processing system set forth in any one of the preceding (12) to (15), further comprising a display control unit that controls projection by the projection unit, in which the display control unit changes a display mode of the window according to whether or not settings related to the window are being changed by the processing unit.

(17) The information processing system set forth in the preceding (16), in which while the settings related to the window are being changed by the processing unit, the display control unit sets the display mode of the window to a first display mode, and when the change of the settings related to the window has been completed, the display control unit changes the display mode of the window from the first display mode to a second display mode.

(18) An information processing method comprising:

obtaining operation information regarding user's operation of a display object displayed on a display surface;

correcting, by a processor, an operation direction indicated by the operation information on the basis of a rotation angle of the display object with respect to a reference angle on the display surface; and outputting information indicating the corrected operation direction to an application corresponding to the display object, in which a rotation angle of the display object differs from a rotation angle of the display surface.

(19) A program causing a computer to function as:

an obtaining unit that obtains operation information regarding user's operation of a display object displayed on a display surface; and a processing unit that corrects an operation direction indicated by the operation information on the basis of a rotation angle of the display object with respect to a reference angle on the display surface, and outputs information indicating the corrected operation direction to an application corresponding to the display object, in which a rotation angle of the display object differs from a rotation angle of the display surface.

REFERENCE SIGNS LIST

10 Information processing system
20 Projection target
30 Window
50 Operation unit
60 Information processing terminal
90 Table
100 Platform unit
102 Obtaining unit
104 Processing unit
106 Display control unit
120 Communication unit
122 Sensor unit
124 Display unit
200 Application
600 Operation display unit

The invention claimed is:

1. An information processing system comprising:
an obtaining unit configured to obtain operation information regarding a user's operation of a display object displayed on a display surface; and
a processing unit configured to
correct an operation direction and an operation amount indicated by the operation information on a basis of a rotation angle of the display object with respect to a reference angle on the display surface, and
initiate output of information indicating the corrected operation direction and the corrected operation amount to an application corresponding to the display object,
wherein the rotation angle of the display object differs from a rotation angle of the display surface, and
wherein the obtaining unit and the processing unit are each implemented via at least one processor.

2. The information processing system according to claim 1, wherein the display object is configured to be projected, by a projector, on a projection target that includes the display surface.

3. The information processing system according to claim 2, wherein the display object is a window.

4. The information processing system according to claim 2, wherein
at least two display objects are projected on the projection target by the projector, and
respective rotation angles of the at least two display objects with respect to the reference angle on the display surface differ from each other.

5. The information processing system according to claim 4, wherein the processing unit corrects the operation direction on a basis of the rotation angle of the display object that is an operation target indicated by the operation information, the display object being selected from among the at least two display objects, and initiates output of the information indicating the corrected operation direction to an application corresponding to the display object that is the operation target.

6. The information processing system according to claim 2, wherein the processing unit further corrects the operation direction on a basis of whether or not the operation indicated by the operation information is a direct operation of the display object.

7. The information processing system according to claim 6, wherein, in a case where the operation indicated by the operation information is an indirect operation of the display object, the processing unit further corrects the operation direction on a basis of a positional relationship between the projection target and the user.

8. The information processing system according to claim 7, wherein the indirect operation of the display object includes input of direction information into an operation unit,
wherein the operation unit is implemented via at least one processor.

9. The information processing system according to claim 6, wherein the direct operation of the display object includes a touch gesture on the projection target.

10. The information processing system according to claim 2, wherein
a captured image obtained by image-capturing the projection target is transmitted to an information processing terminal having a display,
the operation information indicates operation of the captured image displayed on the display,
the obtaining unit obtains the operation information from the information processing terminal, and
the processing unit further corrects the operation direction on a basis of a result of subjecting the captured image to object recognition.

11. The information processing system according to claim 10, wherein the processing unit further corrects the operation amount indicated by the operation information on a basis of the result of subjecting the captured image to the object recognition.

12. The information processing system according to claim 3, wherein
the operation information indicates a touch gesture on the window, and
the processing unit further is further configured to determine, on a basis of whether or not a position of the touch gesture is in a predetermined area in the window, either to correct the operation direction or to change settings related to the window.

13. The information processing system according to claim 12, wherein the settings related to the window include a rotation angle of the window with respect to the projection target.

14. The information processing system according to claim 13, wherein in a case where the position of the touch gesture is in the window other than the predetermined area, the processing unit corrects the operation direction on a basis of a rotation angle of the window with respect to the projection target.

15. The information processing system according to claim 13, wherein in a case where the position of the touch gesture is in the predetermined area, the processing unit changes settings related to the window by changing the rotation angle of the window with respect to the projection target on a basis of the touch gesture.

16. The information processing system according to claim 12, further comprising:
a display control unit that controls projection by the projector,
wherein the display control unit is configured to change a display mode of the window according to whether or not the settings related to the window are being changed by the processing unit, and wherein the display control unit is implemented via at least one processor.

17. The information processing system according to claim 16, wherein while the settings related to the window are being changed by the processing unit, the display control unit is configured to set the display mode of the window to a first display mode, and when the change of the settings related to the window has been completed, the display control unit changes the display mode of the window from the first display mode to a second display mode.

18. An information processing method comprising:

obtaining operation information regarding a user's operation of a display object displayed on a display surface;

correcting, by a processor, an operation direction and an operation amount indicated by the operation information on a basis of a rotation angle of the display object with respect to a reference angle on the display surface; and outputting information indicating the corrected operation direction and the corrected operation amount to an application corresponding to the display object, wherein a rotation angle of the display object differs from a rotation angle of the display surface.

19. A non-transitory computer-readable storage medium having embodied thereon a program, which when executed by a computer causes the computer to execute a method, the method comprising:

obtaining operation information regarding a user's operation of a display object displayed on a display surface;

correcting an operation direction and an operation amount indicated by the operation information on a basis of a rotation angle of the display object with respect to a reference angle on the display surface; and outputting information indicating the corrected operation direction and the corrected operation amount to an application corresponding to the display object, wherein a rotation angle of the display object differs from a rotation angle of the display surface.

* * * * *